(12) United States Patent
Cogar

(10) Patent No.: US 11,351,482 B2
(45) Date of Patent: Jun. 7, 2022

(54) DEWATERING UNIT AND METHOD OF USING THE SAME

(71) Applicant: Cogar Manufacturing, Inc., Beckley, WV (US)

(72) Inventor: Lowell Cogar, Beckley, WV (US)

(73) Assignee: COGAR MANUFACTURING, INC., Beckley, WV (US)

( * ) Notice: Subject to any disclaimer, the term of this patent is extended or adjusted under 35 U.S.C. 154(b) by 437 days.

(21) Appl. No.: 16/509,859

(22) Filed: Jul. 12, 2019

(65) Prior Publication Data
US 2021/0008468 A1    Jan. 14, 2021

(51) Int. Cl.
| | |
|---|---|
| *B01D 29/03* | (2006.01) |
| *B01D 29/94* | (2006.01) |
| *B01D 29/76* | (2006.01) |
| *B01D 29/90* | (2006.01) |

(52) U.S. Cl.
CPC .............. *B01D 29/03* (2013.01); *B01D 29/76* (2013.01); *B01D 29/90* (2013.01); *B01D 29/94* (2013.01)

(58) Field of Classification Search
CPC ........ B01D 33/27; B01D 29/01; B01D 35/34; B01D 29/64; B01D 29/88; B01B 1/10; B66C 13/02; B63B 25/006; Y02W 30/52; C02F 2201/008; C02F 2303/24; C02F 2203/008; B65G 67/606; B65G 67/60; B65G 67/603; B65G 2814/0397; B65G 2201/04; B65G 17/126; B61D 17/16; B61D 5/08
See application file for complete search history.

(56) References Cited

U.S. PATENT DOCUMENTS

| | | | | |
|---|---|---|---|---|
| 2,845,180 | A | * | 7/1958 | McAfee .................... C11B 1/00 210/413 |
| 3,612,303 | A | | 10/1971 | Ikeda et al. |
| 3,985,245 | A | | 10/1976 | Schulte |
| 4,447,325 | A | | 5/1984 | Pauley |
| 5,055,204 | A | | 10/1991 | Bogart |
| 5,268,100 | A | * | 12/1993 | Hartzell ............. B01D 29/6484 210/396 |
| 5,614,094 | A | * | 3/1997 | Deister ................ B01D 33/015 210/388 |
| 7,966,741 | B2 | | 6/2011 | Gorbell et al. |
| 8,147,689 | B1 | | 4/2012 | Cogar |

(Continued)

*Primary Examiner* — Gregory W Adams
(74) *Attorney, Agent, or Firm* — Sand, Sebolt & Wernow Co., LPA

(57) ABSTRACT

A dewatering unit in the form of a railcar having bogies thereon to move the unit on rail tracks. The dewatering unit has first and second ends, first and second sides, and a bottom that bound and define an interior chamber. A conveyor is provided in the interior chamber and screens are located in the bottom and first and second sides. A grizzly is located below an opening in the unit's top and above the conveyor. Stabilizing assemblies are deployed to contact the ground and lift some weight off of the bogies prior to loading. A solid material/liquid mixture is dropped through the opening and onto the grizzly which partially fractures the solid material. Further fracturing is undertaken by conveyor drag bars and crushers located adjacent the conveyor. Liquid drains from the unit through the screens. The dewatered solid material is lifted out of the unit by the conveyor.

24 Claims, 19 Drawing Sheets

(56) References Cited

U.S. PATENT DOCUMENTS

| | | |
|---|---|---|
| 8,302,890 B2 | 11/2012 | Lewis-Gray |
| 2003/0121863 A1 | 7/2003 | Kelly et al. |
| 2010/0186621 A1 | 7/2010 | Smith |
| 2015/0183657 A1 | 7/2015 | Wright |
| 2017/0225018 A1 | 8/2017 | Palet |

* cited by examiner

| FIG.2A | FIG.2B | FIG.2C |

FIG.2

| FIG.3A | FIG.3B | FIG.3C |

FIG.3

| FIG.4A | FIG.4B | FIG.4C |

FIG.4

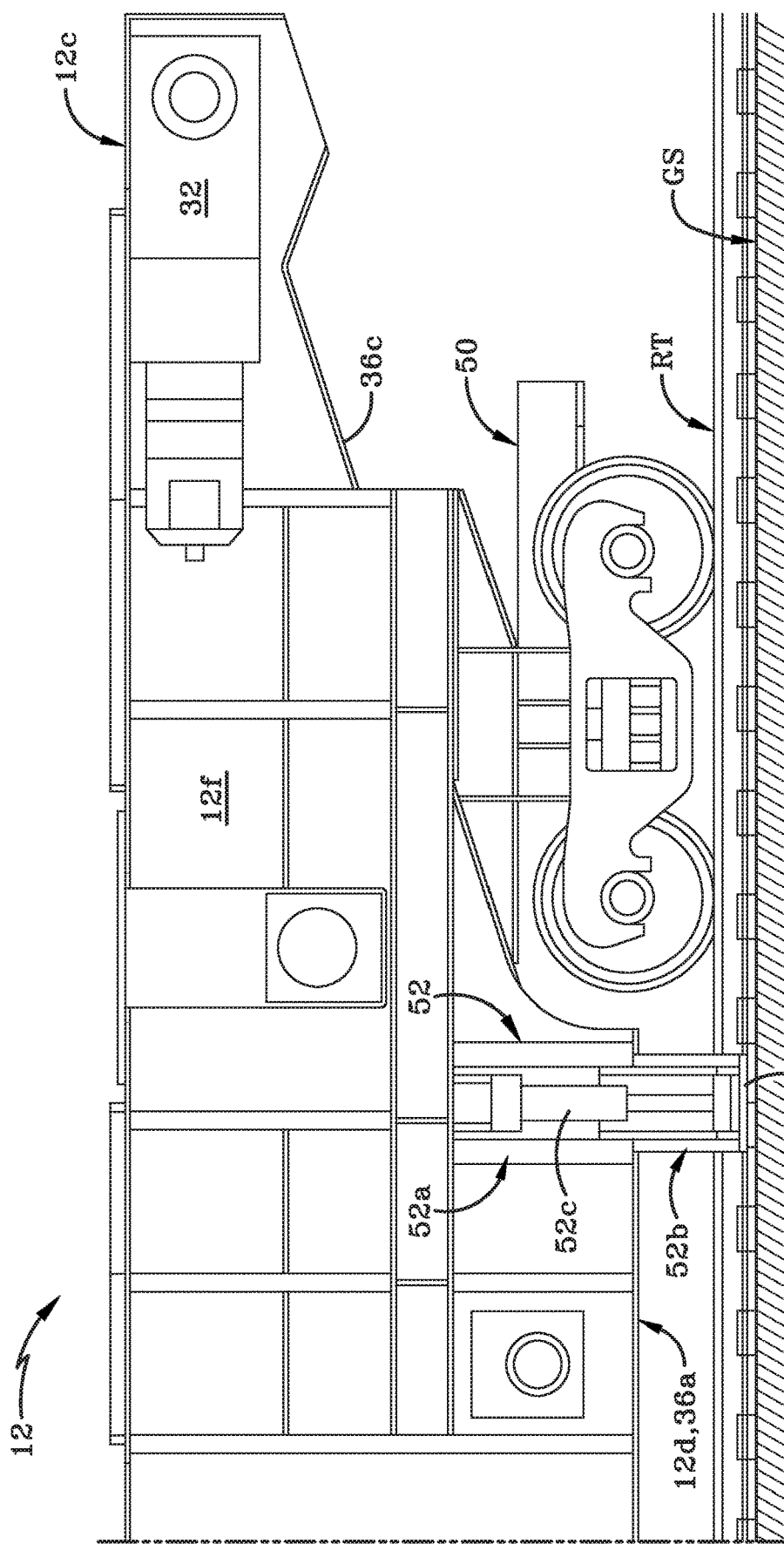

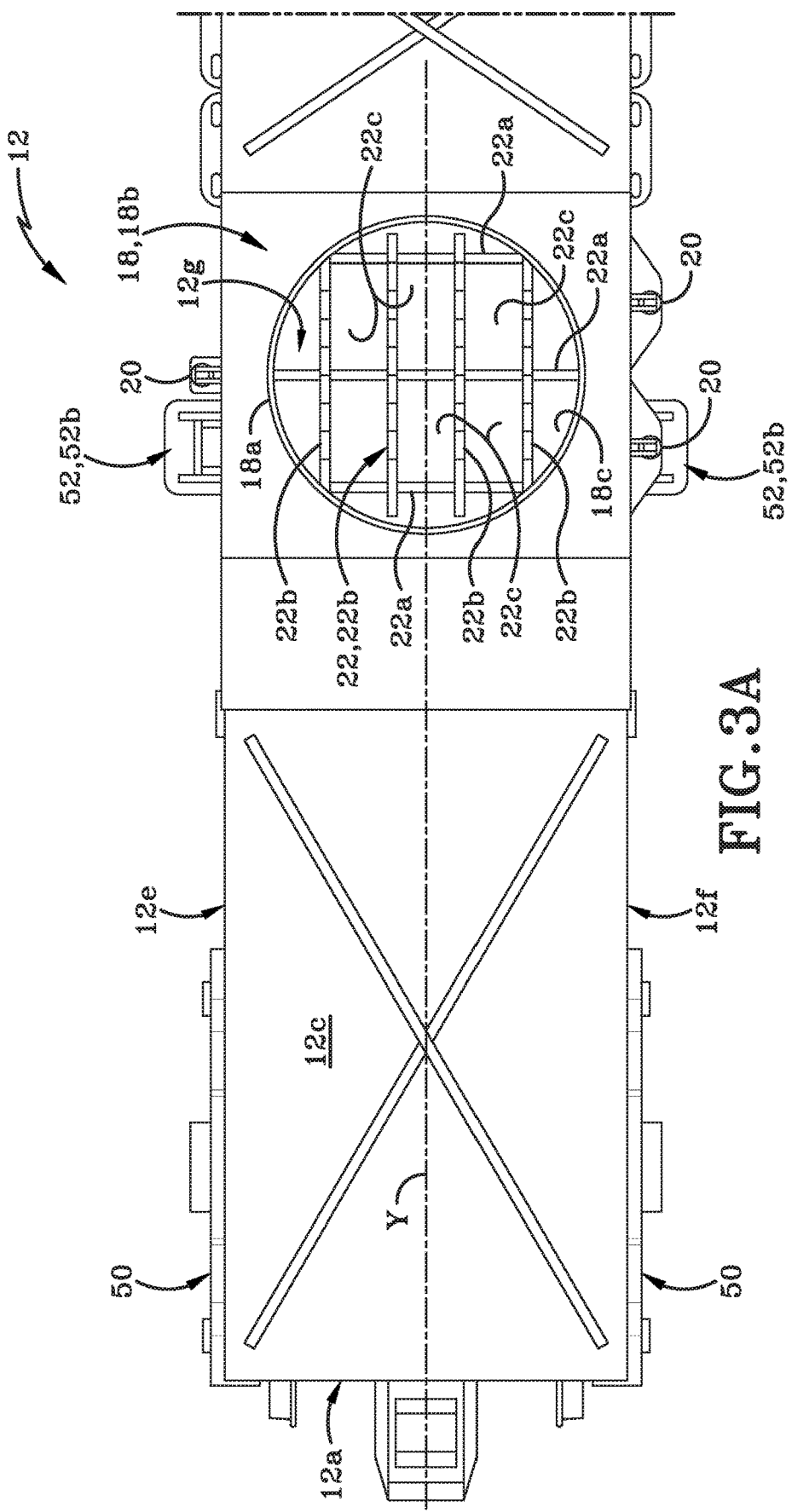

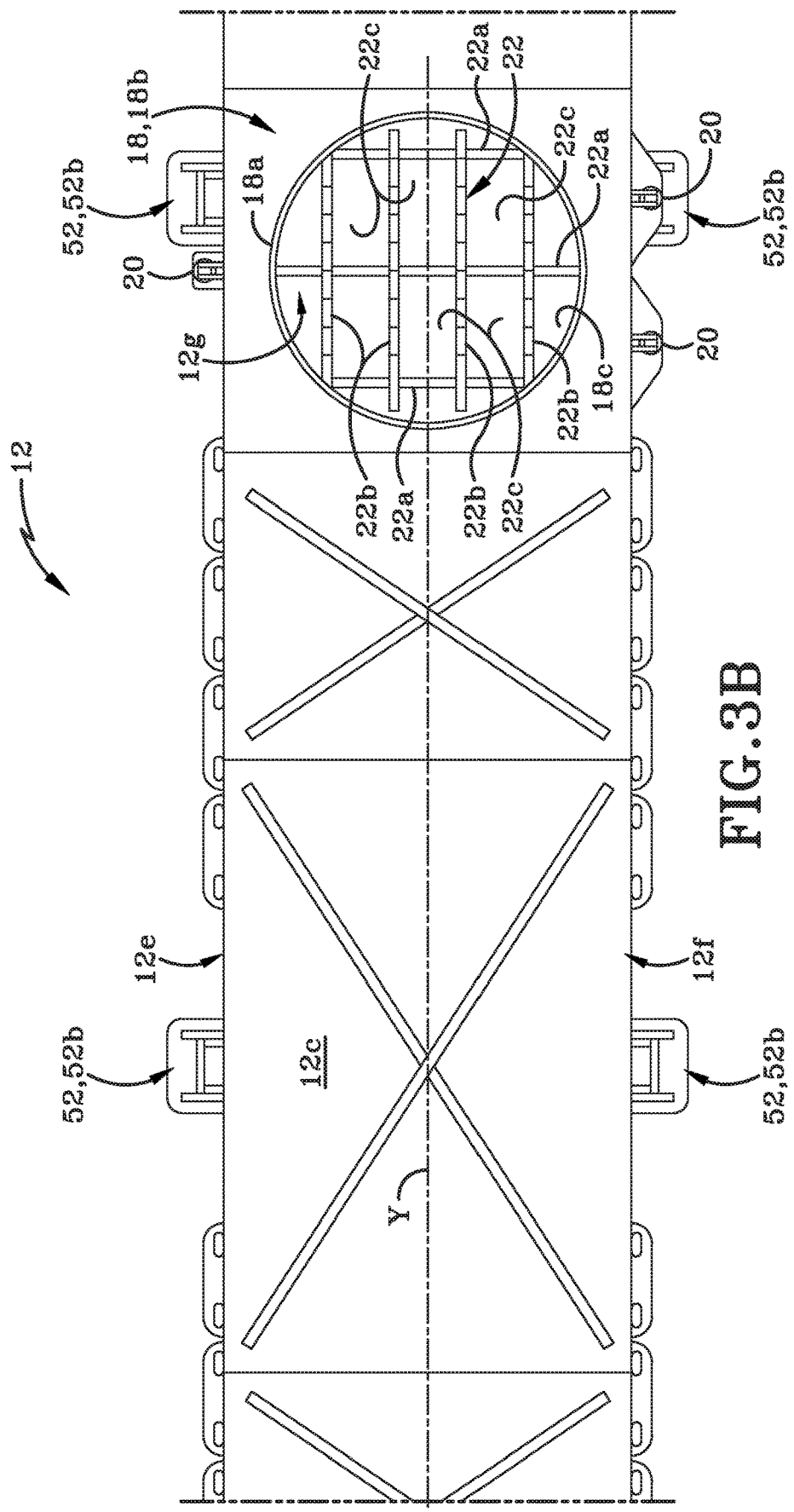

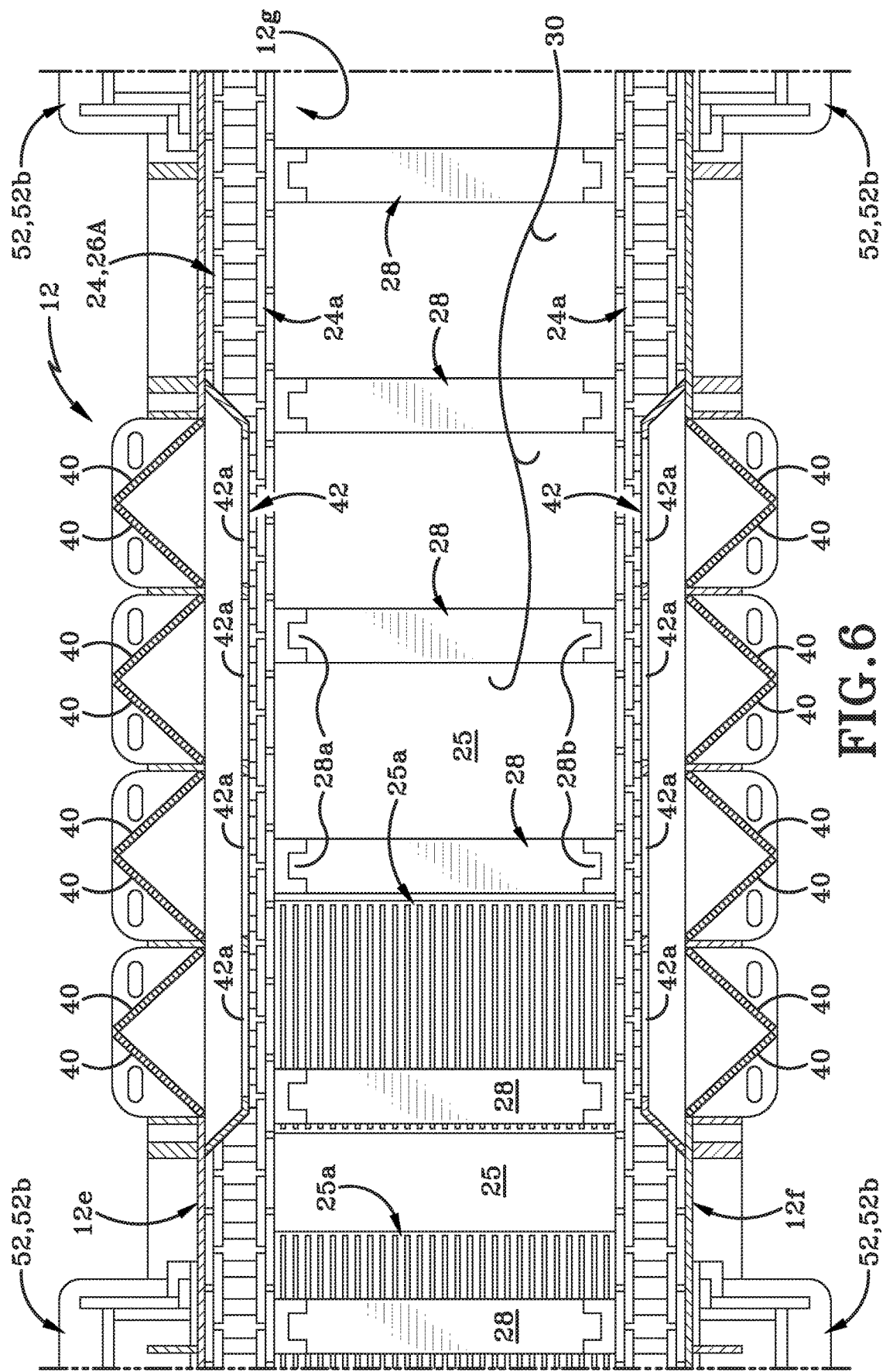

DEWATERING UNIT AND METHOD OF USING THE SAME

BACKGROUND

Technical Field

The present disclosure relates generally to methods and systems for dewatering solid materials from a solid/liquid mixture. In particular, the present disclosure is directed to a dewatering unit that may be utilized in rail/pad dump applications or in pit dump applications for dewatering coke or coal. Specifically, the present disclosure relates to a dewatering unit having movable connector members, a grizzly positioned beneath each connector member, liquid-draining screens in the bottom and side walls, and a conveyor for moving the dewatered solids out of the unit. The dewatering unit may be in the form of a railcar including a plurality of rail bogies along with stabilizing assemblies that are deployed to support at least some of the weight of the unit.

Background Information

Petcoke (i.e., petroleum coke) is a solid, coal-like material that may be produced as part of an oil refining process. Petcoke may be produced by delayed a coking process or by a fluid coking process. During the coking process, heat may be used to crack or break down large hydrocarbon molecules to produce petcoke. In some instances, the coking process occurs in coking units also known as coking drums or coking towers that may be about 32 feet in diameter and around 100 feet tall. A large quantity of hardened coke builds up in the coking unit and is typically removed therefrom by boring a hole into the coke and then using high pressure water to blast pieces of the coke from the coking unit. A mixture or slurry of water and petcoke flows out of the coking unit and is typically deposited into a dewatering unit so that water can be removed from the mixture or slurry.

U.S. Pat. No. 8,147,689 (Cogar) discloses a dewatering unit that is suitable for removing liquid from a mixture of coke and liquid that exits a coking unit. The dewatering unit separates chunks of petcoke from the large quantity of a liquid (such as water) used to unload coking towers. The dewatering unit includes upstanding walls that bound and define a containment region into which a mixture of petcoke and water is introduced. The dewatering unit employs a conveyor having a series of drag bars extending laterally across the conveyor. The drag bars are longitudinally spaced apart from each other. The drag bars are connected at their ends to tandem continuous chains. The top flight of the chains and the drag bars ride on top of a stationary screening deck. The bottom flight of the chains and the drag bars ride on top of a sluice deck. Water drain screens are provided in the screening deck. The discharge end of the dewatering unit is angled. In particular, the screening deck and/or the conveyor angles upwardly toward the discharge end of the dewatering unit. As the mixture of petcoke and water is moved through the dewatering unit by the drag bars, the water drops through the water drain screens and into the sluice deck. The ever-drier petcoke rides on the conveyor and is discharged through the discharge end of the unit.

SUMMARY

While the dewatering unit disclosed in the Cogar U.S. Pat. No. 8,147,689 functions well for its intended purpose, the present disclosure relates to an improved dewatering unit that removes water from a petcoke/water mixture or slurry even faster. Additionally, the unit is able to more effectively reduce the size of the petcoke pieces that emerge from the discharge end of the dewatering unit. Still further, the present disclosure is directed to a dewatering unit that may be engaged and moved on a rail system, or may be utilized in crawler applications or as a stationary unit in a yard or at a pit.

A dewatering unit is disclosed herein. A first embodiment of the dewatering unit is in the form of a railcar having bogies thereon to move the dewatering unit from one location to another along rail tracks. The dewatering unit has first and second ends, first and second sides, and a bottom that bound and define an interior chamber. A conveyor is provided in the interior chamber and screens are located in the bottom and first and second sides. A grizzly is located below an opening in the unit's top and above the conveyor. Stabilizing assemblies are deployed to contact the ground and lift some weight off of the bogies prior to loading. A solid material/liquid mixture is dropped through the opening and onto the grizzly which partially fractures the solid material. Further fracturing is undertaken by conveyor drag bars and crushers located adjacent the conveyor. Liquid drains from the unit through the screens. The dewatered solid material is lifted out of the unit by the conveyor.

It will be understood that the terms "liquid" and "water" may be used interchangeably in this description to represent the liquid component of a mixture that is separated from a solid component using the device and method of the present disclosure. The terms "petcoke", "coke", "coal", and "solid material" should be understood to represent the solid component of the mixture that is separated from a liquid using the device and method of the present disclosure.

The apparatus is designed to dewater coke or coal, to contain fines, and to decrease the cost of reclaiming coke while protecting the water pump system of the apparatus. The apparatus is configured in such a way to help ensure the safety of operators of the equipment. The apparatus may be utilized for both rail/pad dump and pit dump applications. The apparatus may be rail mounted, crawler mounted, or may be stationary. The apparatus may include a single drum or may include dual drums.

In one aspect, an exemplary embodiment of the present disclosure may provide a dewatering unit comprising a body having a first end, a second end, a first side, a second side, and a bottom that bound and define an interior chamber; a conveyor assembly provided in the interior chamber and adapted to move articles toward the second end; at least one first screen positioned below the conveyor assembly; and at least one second screen provided in one or both of the first side and the second side; wherein the at least one first screen and the at least one second screen is adapted to permit liquid to pass therethrough.

In another aspect, an exemplary embodiment of the present disclosure may provide a method of dewatering a mixture of solid material and water; said method comprising dropping a mixture of solid material and water through an opening in a top of a dewatering unit and onto a conveyor assembly; transporting the solid material on the conveyor assembly towards a second end of the dewatering unit; allowing some of the water in the mixture to drain through one or more screens located below the conveyor assembly and out of the dewatering unit; allowing some of the water in the mixture to drain through one or more screens located in one or both of a first side and a second side of the dewatering unit and out of the dewatering unit. In one example, the method further comprises breaking up some of the solid material in the mixture using the grizzly located between the opening and the conveyor assembly. In one example, the method further comprises providing one or more bogies on the dewatering unit; engaging the one or more bogies on a pair of rail tracks; and moving the dewatering unit from a first location to a second location along the rail tracks. In one example, the method further comprises actuating a plurality of stabilizer assemblies provided on the dewatering unit; contacting a ground surface with a footing provided on each of the actuator plurality of stabilizer assemblies; and supporting at least some of the weight of the dewatering unit on the plurality of stabilizing assemblies.

In another aspect, and exemplary embodiment of the present disclosure may provide a railcar comprising a body having a first end, a second end, a first side, a second side, and a bottom that bound and define an interior chamber; one or more bogies operatively engaged with the body and adapted to engage a pair of rail tracks; a conveyor assembly provided in the interior chamber and adapted to move articles toward the second end; at least one first screen positioned below the conveyor assembly, wherein the at least one first screen is adapted to permit liquid to pass therethrough.

In another aspect, and exemplary embodiment of the present disclosure may provide a method of dewatering a mixture of solid material and water; said method comprising engaging one or more rail bogies on a railcar with a pair of rail tracks; moving the railcar along the rail tracks to a container holding a mixture of a solid material and a liquid; dropping a quantity of the mixture of solid material and liquid through an opening in a top of the railcar and onto a conveyor assembly located within an interior chamber of the railcar; transporting the solid material on the conveyor assembly towards a second end of the railcar; allowing some of the liquid in the mixture to drain through one or more first screens located below the conveyor assembly and out of the railcar. In one example, the method includes deploying a plurality of stabilizing assemblies on the railcar to contact a ground surface adjacent the rail tracks prior to dropping the quantity of the mixture through the opening. In one example, the method includes allowing some of the liquid in the mixture to drain through one or more second screens located in one or both of a first side and a second side of the railcar and out of the railcar. In one example, the method includes breaking up some of the solid material in the mixture using the grizzly located between the opening and the conveyor assembly. In one example, the method includes aligning the opening in the top of the railcar with a chute of the container; and raising a connector member on the railcar proximate the opening to engage the chute of the container prior to dropping the quantity of the mixture through the opening.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 2 is a block diagram showing the relationship between FIGS. 2A, 2B and 2C;

FIG. 2C is a side elevation view of a second end of the dewatering unit;

FIG. 3 is a block diagram showing the relationship between FIGS. 3A, 3B and 3C;

FIG. 3A is a top plan view of the first end of the dewatering unit;

FIG. 3B is a top plan view of the middle region of the dewatering unit;

FIG. 4 is a block diagram showing the relationship between FIGS. 4A, 4B and 4C;

FIG. 6 is a top plan view taken along line 6-6 of FIG. 4B;

Similar numbers refer to similar parts throughout the drawings.

DETAILED DESCRIPTION

An apparatus, system, and method of dewatering a mixture of a solid material and a liquid is disclosed herein. By way of example only, the apparatus, system, and method is described with reference to a mixture of petcoke and water. In particular, the apparatus, system, and method is described with reference to petcoke removed from coking ovens utilizing high pressure water jets. It will be understood however that this apparatus, system, and method may be used in other applications such as when a petcoke/water mixture is removed from pits and it is desired to separate the solid material from the liquid. It will further be understood that apparatus, systems, and methods based on the principles described herein may be used in other industries where solid material is to be separated from a mixture.

Figure 1:
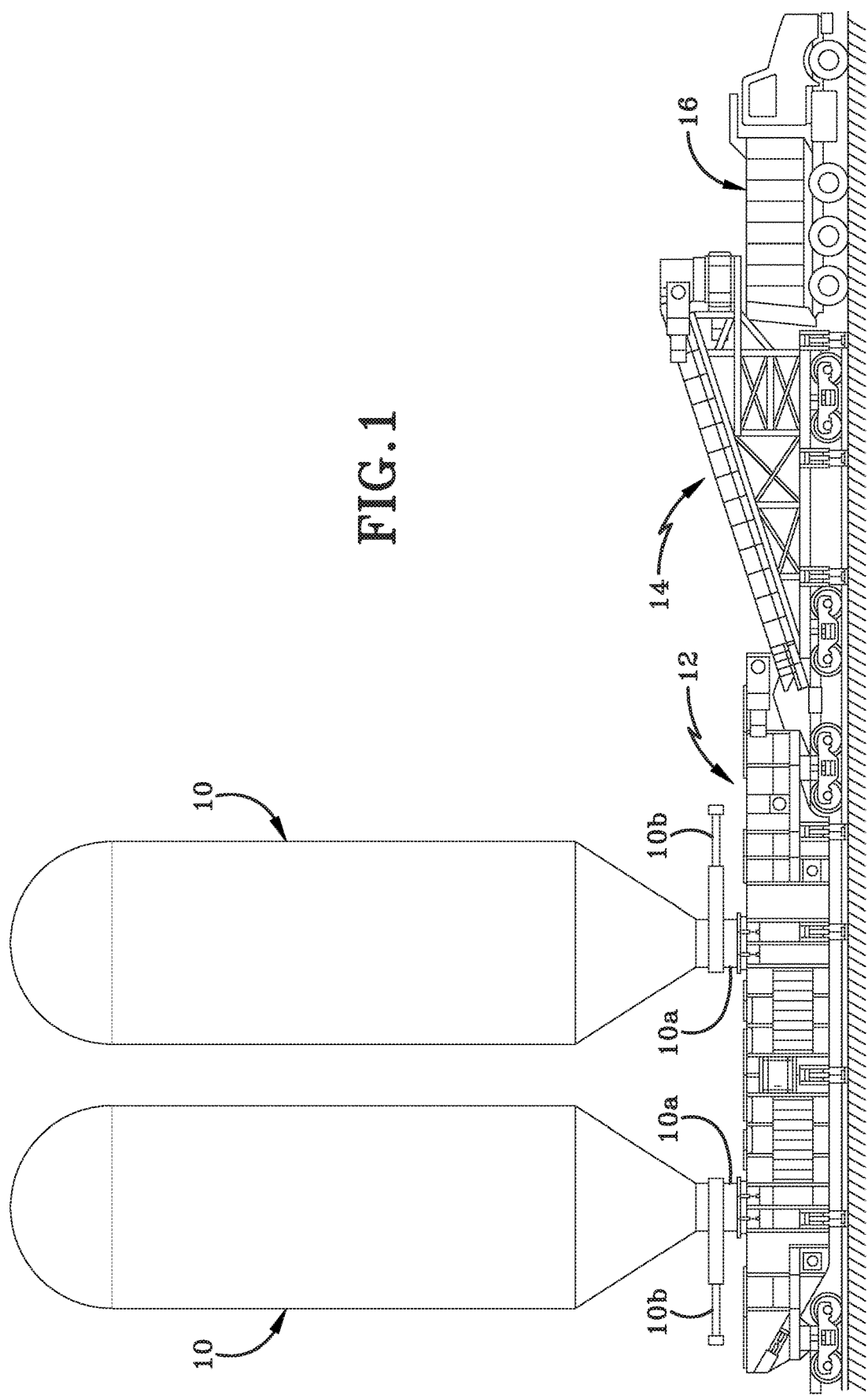
FIG. 1 is a diagrammatic side elevation view of a pair of coking ovens, a first embodiment of a dewatering unit in accordance with the present disclosure, a secondary dewatering unit in accordance with the present disclosure, and a truck that receives product processed by the dewatering unit and secondary dewatering unit.

Referring to FIG. 1 there is shown a side elevation view of a pair of coking ovens 10 and a system for separating petcoke from a mixture of petcoke and water. The system includes a first embodiment of a dewatering unit in accordance with the present disclosure, generally indicated by the reference number 12. The system may further include a secondary dewatering unit in accordance with the present disclosure, generally indicated by the reference number 14. The system may further include a truck 16 or other type of container, whether mobile or stationary. The truck 16 is illustrated by way of example only.

As shown in FIG. 1, dewatering unit 12 is positioned to receive a mixture of petcoke and water from coking ovens 10. Secondary dewatering unit 14 is positioned to receive a processed end product from dewatering unit 12. Truck 16 is positioned to receive a further processed end product from secondary dewatering unit 14. It will be understood that secondary dewatering unit 14 may be omitted from the system and truck 16 may be positioned to receive the processed end product from dewatering unit 12. In other instances, truck 16 may be omitted and the processed end product from dewatering unit 12 may be offloaded onto the ground or into a pit or into any other desired types or style of receptacle or container.

Figure 2A:
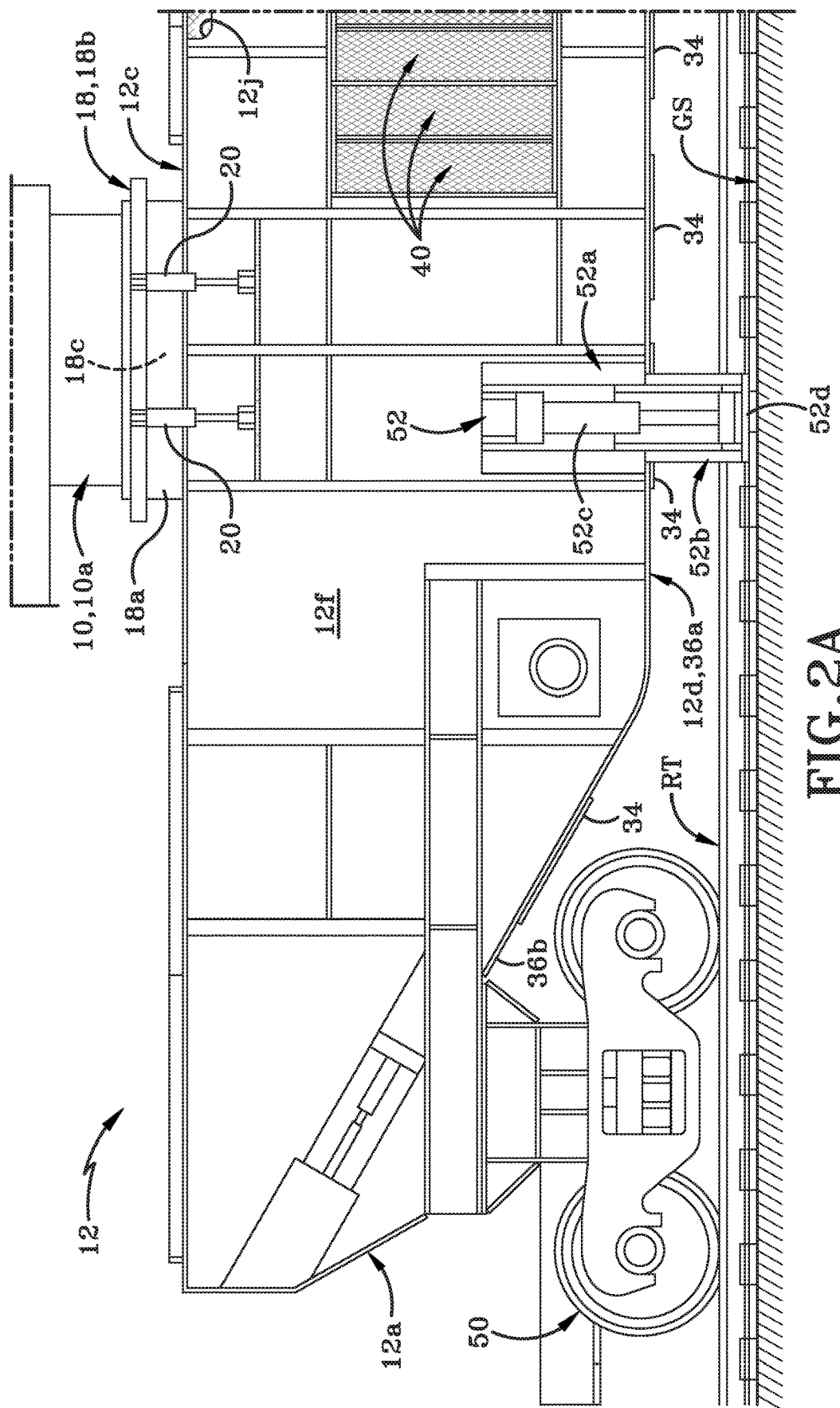
FIG. 2A is a side elevation view of a first end of the dewatering unit in accordance with the present invention and shown in FIG. 1.
Figure 2B:
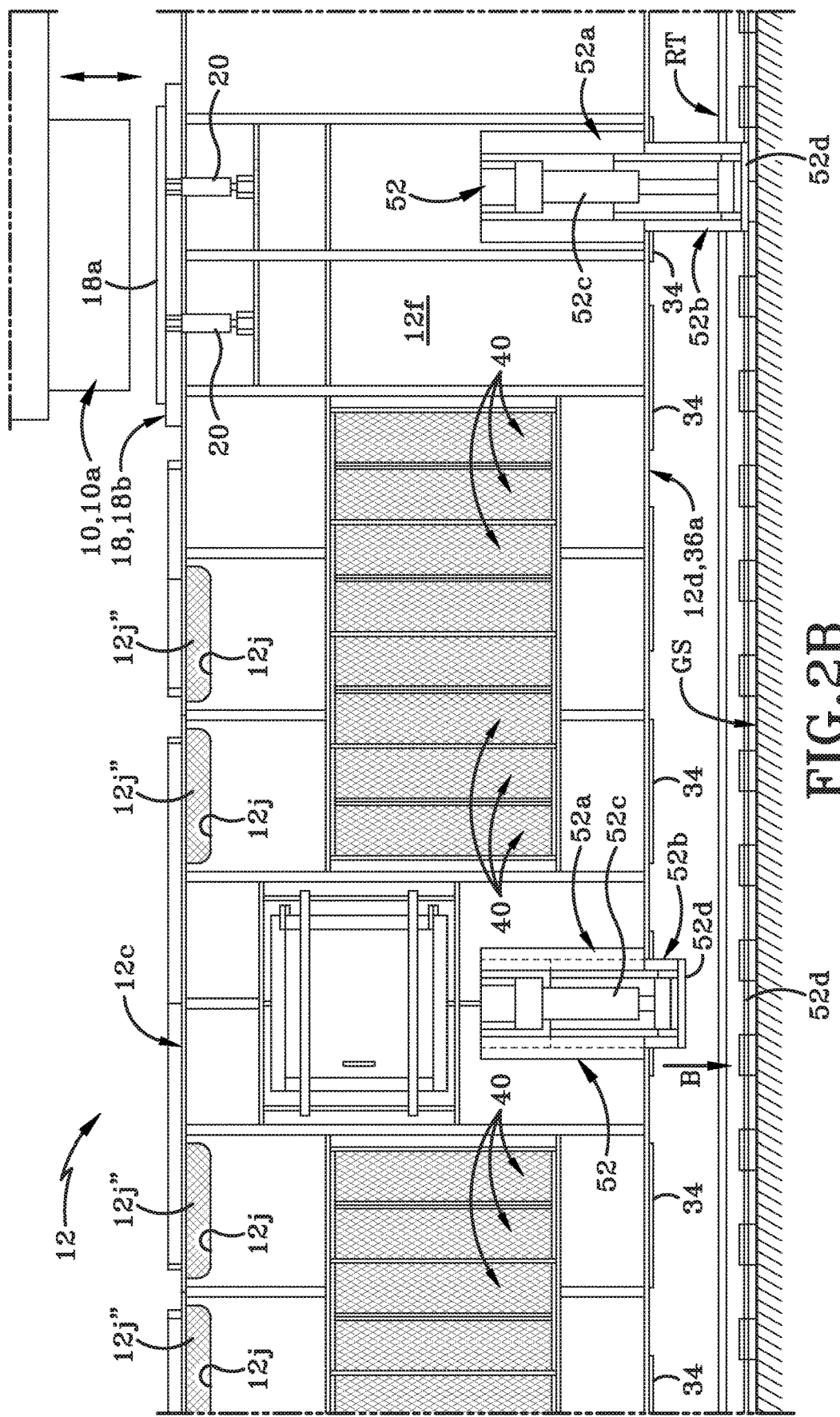
FIG. 2B is a side elevation view a middle region of the dewatering unit.
Figure 3C:
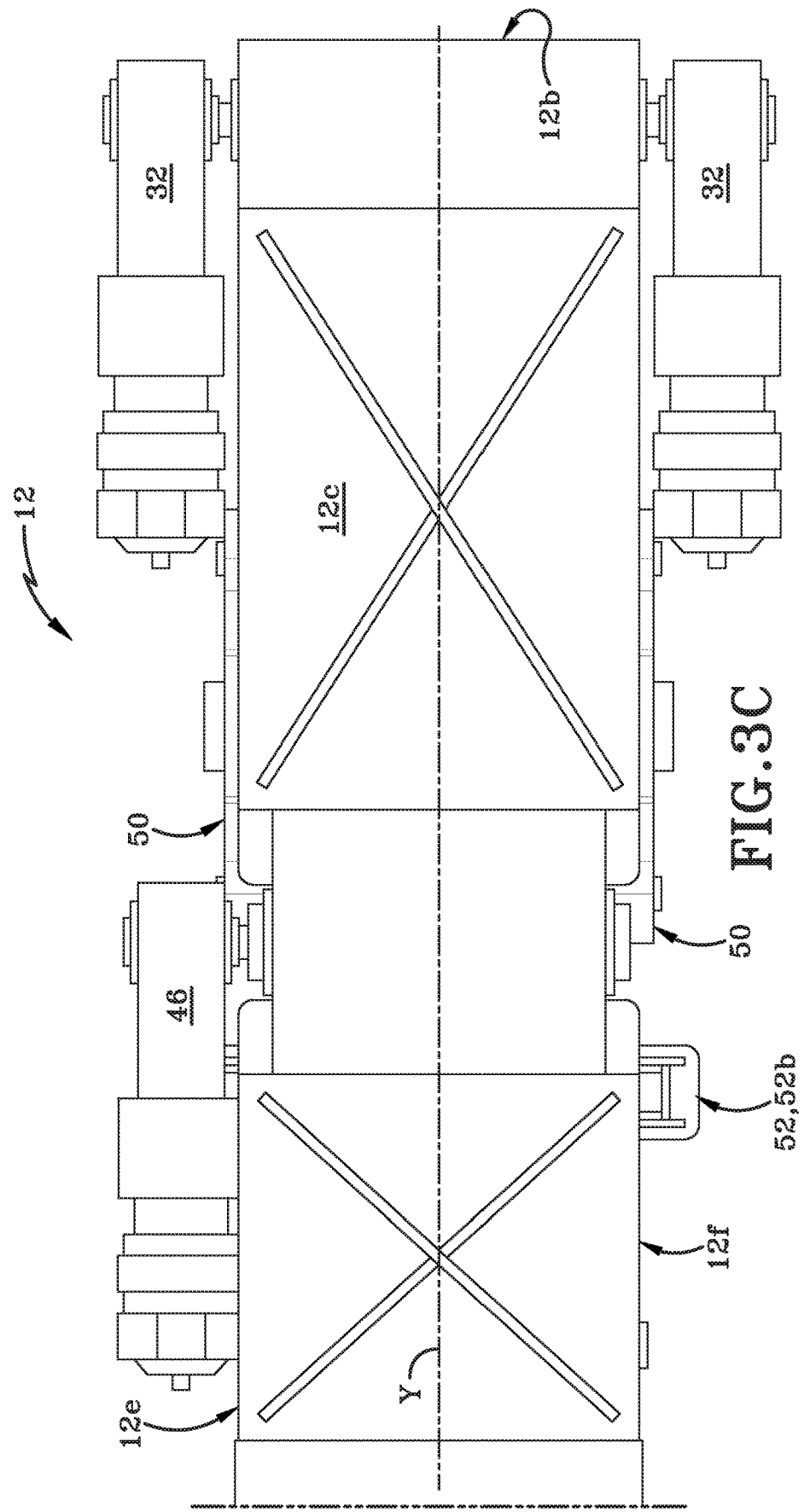
FIG. 3C is a top plan view of the second end of the dewatering unit.
Figure 4A:
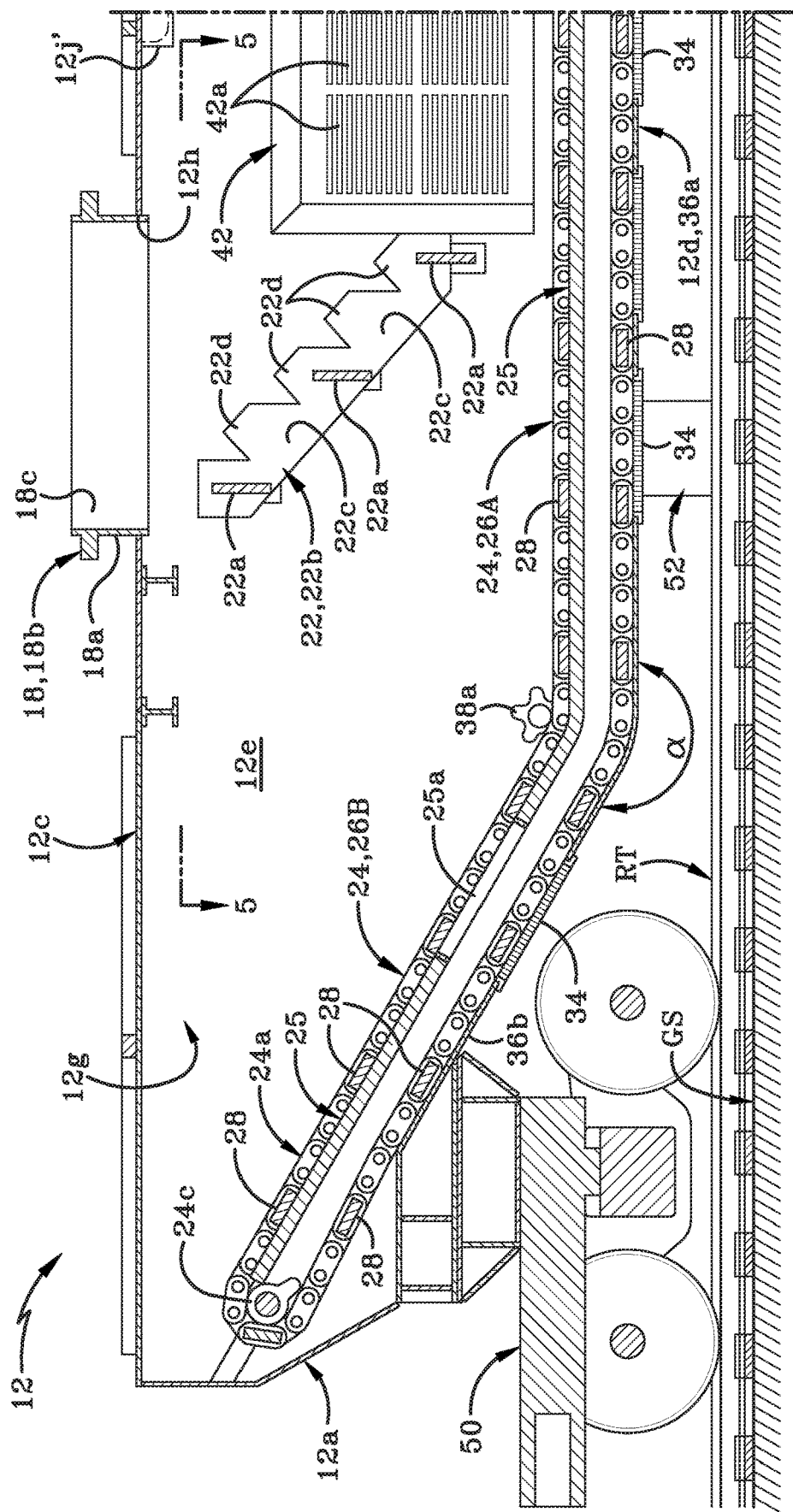
FIG. 4A is a longitudinal cross-section of the first end of the dewatering unit.
Figure 4B:
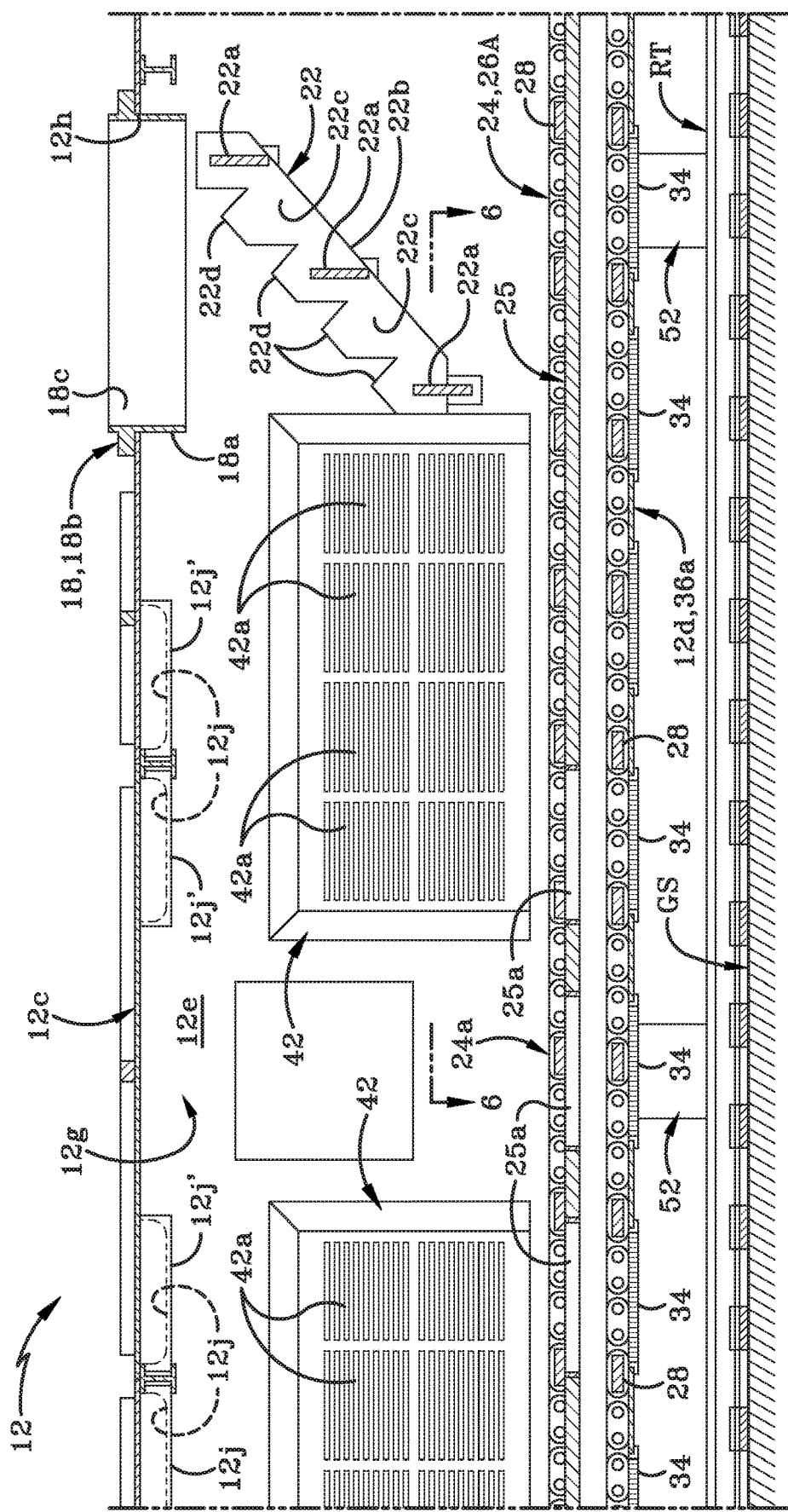
FIG. 4B is a longitudinal cross-section of the middle region of the dewatering unit.
Figure 4C:
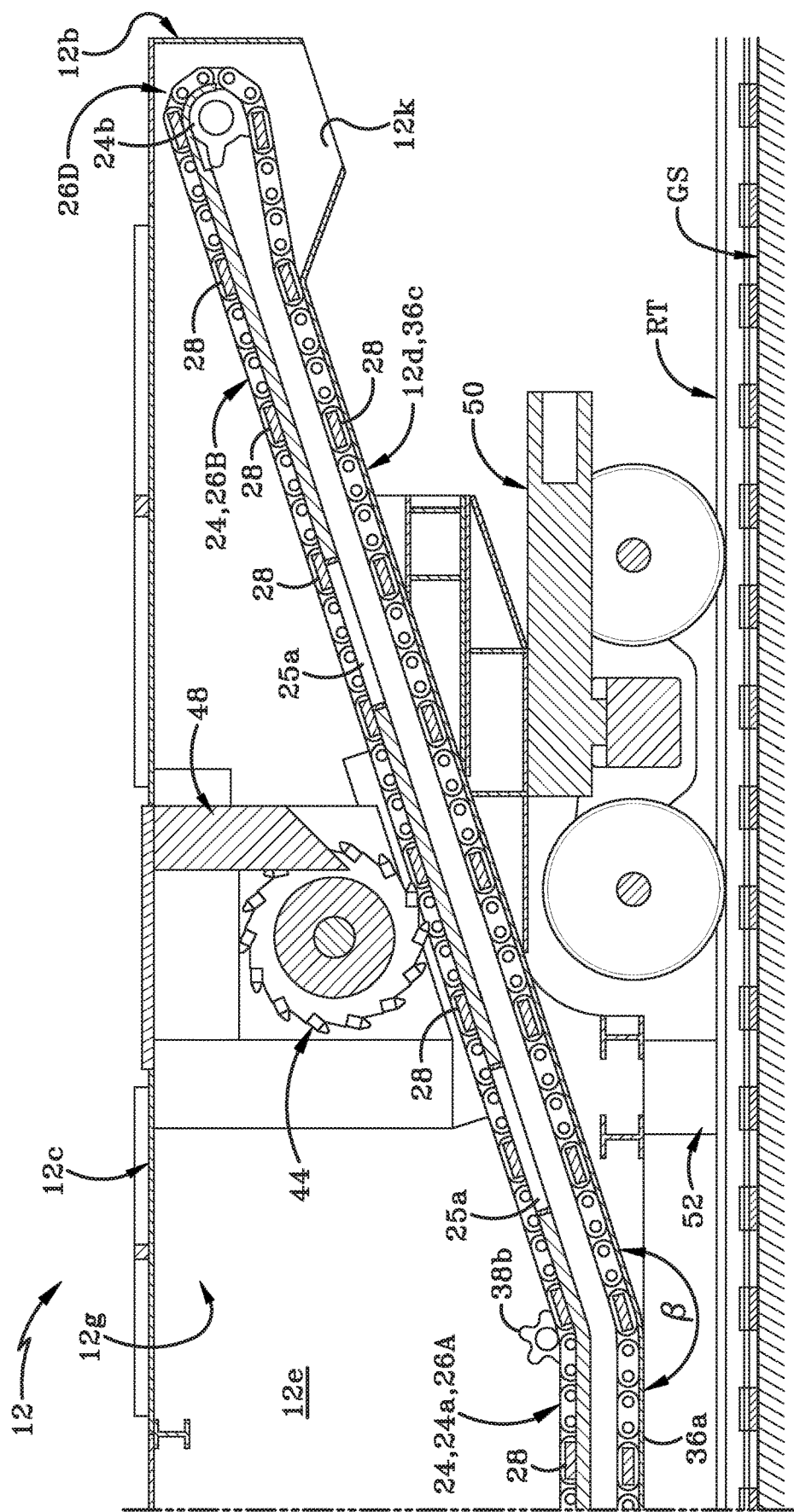
FIG. 4C is a longitudinal cross-section of the second end of the dewatering unit.
Figure 5:
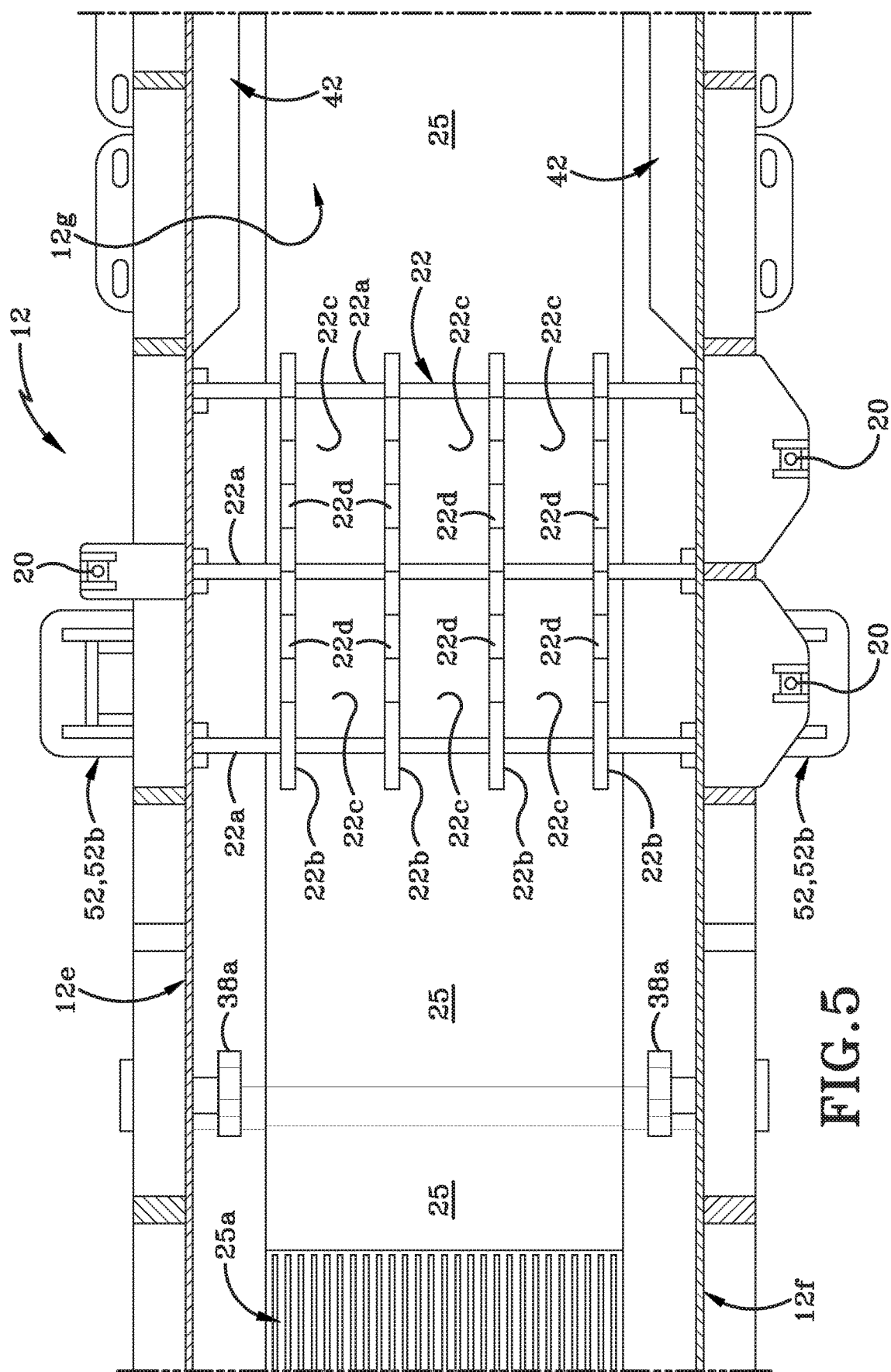
FIG. 5 is a top plan view taken along line 5-5 of FIG. 4A.

Referring to FIGS. 1 through 7C, the first embodiment dewatering unit 12 will be described in greater detail. FIGS. 2A, 2B, and 2B show the dewatering unit separated into a first section, a central region, and a second section, respectively, for clarity of illustration. FIG. 2 shows how FIGS. 2A, 2B, and 2C are related to each other. FIGS. 3A, 3B, and 3C show top plan views of the first section, central region, and second section, respectively, for clarity of illustration. FIG. 3 shows how FIGS. 3A, 3B, and 3C are related to each other. FIGS. 4A, 4B, and 4C show longitudinal cross-sections of the first section, central region, and second section, respectively, for clarity of illustration. FIG. 4 shows how FIGS. 4A, 4B, and 4C are related to each other Dewatering unit comprises a body having a first end 12a, a second end 12b (FIG. 2C, a top 12c, a bottom 12d, a first side 12e (FIG. 3A), and a second side 12f. First end 12a and second end 12b define a longitudinal direction between them and a central longitudinal axis "Y" (FIG. 3A) extends between first end 12a and second end 12b. Top 12c and bottom 12d define a vertical direction therebetween. First side 12e and second side 12f define a lateral or transverse direction therebetween. First end 12a, second end 12b, top 12c, bottom 12d, first side 12e, and second side 12f bound and define an interior chamber 12g (FIG. 4A)

The first end 12a, second end 12b, top 12c, bottom 12d, first side 12e, and second side 12f form a tank shell that is preferably fabricated from carbon steel which is hot dip galvanized for corrosion resistance. The capacity of interior chamber 12g varies depending on the application to which dewatering unit 12 is to be put. For example, the capacity of interior chamber 12g may range from about 18,000 gallons up to about 20,000 gallons. It will be understood that any suitably sized tank may be provided on dewatering unit 12.

As best seen in FIGS. 4A and 4B, one or more openings 12h are defined into chamber 12g. In particular, the one or more openings 12h are defined in top 12c and are in fluid communication with interior chamber 12g. Openings 12h are utilized for a quantity of a petcoke/water mixture to be transferred from two spaced-apart coking ovens 10 (FIG. 1) to the interior chamber 12g of dewatering unit 12. It will be understood that in order for the dewatering unit 12 to receive the petcoke/water mixture from the two coking ovens 10 at substantially the same time, the spacing between openings 12h will need to be substantially complementary to the spacing between the chutes 10a of the coking ovens 10.

Dewatering unit 12 is illustrated in the attached FIGS. 2A-7C as including two openings 12h but it will be understood that in other examples only one opening 12h may be defined in top 12c. When only one opening 12h is defined in top 12c, then dewatering unit 12 will be utilized to receive a petcoke/water mixture from a single coking oven 10. It will be understood in other applications, more than two openings 12h may be defined in top 12c of dewatering unit 12 to enable a petcoke/water mixture to be received into chamber 12g of dewatering unit 12 from more than two coking ovens 10.

Dewatering unit 12 is also provided with one or more overflow weirs 12j (FIGS. 2B, 4B) in one or both of the first sides 12e, 12f. The overflow weirs 12j help to capture any overflow or spillage that may occur when loading petcoke/water mixture from coking oven 10 through openings 12h and into interior chamber 12g and the interior chamber gets too full. The overflow weirs 12j may be provided with diverter plates 12j' (FIG. 4B) to direct spillage away from top 12c and into weirs 12j so that the spillage may be captured and processed properly. As best seen in FIG. 4B, the overflow weirs 12j are coarsely screened with screens 12j" (FIG. 2A) that filter out solid material (such as petcoke and some fines) in the water that is moving into overflow weirs 12j and out of dewatering unit 12.

A connector member 18 is provided to limit access through each opening 12h and into interior chamber 12g. Each connector member 18 includes a vertically-oriented peripheral wall 18a, a horizontally-oriented top rim 18b, and a central bore 18c. One or more actuators 20 are operably engaged with each connector member 18 and with a portion of the top 12c or first or second sides 12e, 12f of dewatering unit 12. Actuators 20 are selectively operable to selectively raise and lower connector member 18. It will be understood that actuators 20 may be of any suitable type. For example, hydraulic cylinders, electric cylinders or pneumatic cylinders may be suitable as actuators 20. When dewatering unit 12 is positioned under coking ovens 10 (FIGS. 1, 2B) such that at least one of the connector members 18 is aligned with at least one chute 10a thereof, the associated actuators 20 are activated. Actuators 20 cause the associated connector member 18 to be raised upwardly relative to top 12c of dewatering unit 12 from a lowered position, i.e., a storage position (FIGS. 2B and 4B) into a raised position, i.e., a use position (FIGS. 2A and 4A) with chute 10a on coking oven 10. Once connector member 18 is in the correct position, a valve 10b (FIG. 1) on coking oven 10 is opened and the petcoke/water mixture flows from coking oven 10 into interior chamber 12g. The raising of connector member 18 relative to top 12c helps to create the type of connection between coking oven 10 and dewatering unit 12 that will tend to reduce the potential for spillage of the petcoke/water mixture flowing out of the exit 12a onto and surrounding dewatering unit 12. Once the petcoke/water mixture flow from coking oven 10 to dewatering unit 12 ceases, actuators 20 are activated to lower connector members 18 from the connection position back into a storage position. In this storage position, the vertical wall 18a of connector member 18 is lowered into interior chamber 12g and rim 18b rests on an exterior surface of top 12c or is moved downwardly toward the exterior surface. This is shown in FIG. 4B.

Referring to FIGS. 3A-4B, a grizzly 22 is positioned a distance vertically below a bottom end of each connector member 18. As shown in FIG. 3A, each grizzly 22 includes a plurality of bars 22a and crossbars 22b that are arranged to define a plurality of spaces 22c between them. At least an upper surface of one or more bars 22a and/or one or more crossbars 22b is convoluted to present a plurality of angular, upstanding teeth 22d (FIG. 4A). One or more regions of each grizzly 22 may be oriented at an angle relative to the interior surface of top 12c. In one example, the grizzlies 22 are configured to present a stepped, stair-like obstruction located beneath the chute of the connector member 18 as is illustrated in FIG. 4A. Each grizzly 22 may be fabricated from 3" thick AR-400 steel and is shaped in a manner to create sharp penetrating teeth 22d. The penetrating teeth 22d help to break large solid masses of petcoke falling from coking ovens 10 into a more manageable size for handling and crushing by dewatering unit 12, as will be further described herein. When the petcoke/water mixture flows out of coking oven 10 and through the bore 18c of connector member 18, the larger pieces of petcoke may strike the bars 22a, crossbars 22b, and/or teeth 22d of grizzly 22 and may be fractured into smaller pieces that then drop through openings 22c. The larger pieces of petcoke may also "bounce" down the stepped configuration of the grizzly 22 and become further fractured.

Dewatering unit 12 also includes a conveyor assembly 24 that is substantially similar to the conveyor assembly described in detail in U.S. Pat. No. 8,147,689 (the entire disclosure of which is incorporated herein by reference). Conveyor assembly 24 differs in shape to the conveyor assembly disclosed in U.S. Pat. No. 8,147,689 but the basic structure of the two conveyor assemblies are the same. As such, conveyor assembly 24 comprises a pair of laterally-spaced apart continuous chains 24a that are mounted around drive sprockets 24b (FIG. 4C) and an idler sprocket 24c (FIG. 4B). Conveyor assembly 24 is supported on a conveyor table 25 that includes a plurality of grates 25a therein. Conveyor table 25 retains the chains 24a a distance above an interior surface of the bottom 12d of dewatering unit 12 and below grizzlies 22. Chains 24a form a continuous loop and conveyor table 25 divides the conveyor assembly into a top flight that is located above conveyor table 25 and a bottom flight that is located below the conveyor table 25. The drive sprocket 24b and idler sprocket 24c drive the chains 24a of conveyor assembly 24 such that the top flight moves in a direction from first end 12a to second end 12b, and the bottom flight moves in a direction from second end 12b to first end 12a. A plurality of drag bars 28 span the lateral distance between chains 24a. Each end 28a, 28b (FIG. 6) of each drag bar 28 is secured to one of the chains 24a. Drag bars 28 are therefore oriented at right angles to longitudinal axis "Y" of dewatering unit 12 and to the direction of travel of the chains 24a. Drag bars 28 are longitudinally spaced-apart by spaces 30 from each other. In some instances, adjacent drag bars 28 may be spaced from about 1 foot up to about 3 feet from each other. The chains 24a and drag bars 28 together form the top flight and the bottom flight of conveyor assembly 24 as can be seen in FIG. 4A.

The conveyor chains 24a are sealed conveyor chains that feature alloy heat-treated side bars, stainless steel pins, an inner brass ring seal, and a seal between the side bars. This seal arrangement holds tight onto the pin and rotates within a groove in a bushing. This creates a labyrinth to help prevent debris from getting into the pin/bushing area and thereby promotes longer chain life while preventing chain seizure. Additionally, each drag bar 28 (or flight) of conveyor assembly 24 is preferably fabricated from solid alloy steel to promote long-lasting life and dependability.

A drive assembly 32 (FIG. 3C) is provided on dewatering unit 12 for driving drive sprocket 24b. The drive assembly 32 drives chains 24a in tandem (i.e., in unison) and preferably is a variable rate chain drive assembly to control speed of conveyor assembly 24. One or more screens 34 are defined in bottom 12d of dewatering unit 12. Screens 34 are positioned vertically below the bottom flight of conveyor assembly 24. Each screen 34 defines a plurality of openings therein that allow water and fines to drop therethrough. The water may drop into a sluice located vertically below screens 34. The sluice may form part of the bottom 12d of dewatering tank 12 or may be a separate component. The sluice preferably is configured to direct any water collected therein in a direction opposite to the direction of travel of the petcoke carried by top flight of conveyor assembly 24. As will be described later herein, during use of dewatering unit 12, petcoke blocks will drop onto conveyor assembly 24 and are moved by the top flight of the conveyor assembly 24 toward second end 12b. Water from the petcoke/water mixture drops through spaces 30 between drag bars 28, through the openings in the grates 25a and ultimately through screens 34. The petcoke blocks on conveyor assembly 24 are moved toward second end 12b and are ultimately discharged through an exit opening 12k. The water flowing through spaces 30, through grates 25a tends to be swept along by drag bars 28 in the second flight toward first end 12a and drains through screens 34. The water draining through screens 34 flows from the interior chamber 12g to outside the dewatering unit 12.

As best seen in FIGS. 4A, 4B, and 4C, the bottom 12d of the body of the dewatering unit 12 includes a horizontally-oriented central section 36a that is located vertically beneath the section of top 12c in which openings 12h are defined. The bottom 12d also includes an angled first section 36b and an angled second section 36c. First section 36b extends from proximate first end 12a of dewatering unit 12 to a first end of central section 36a. First section 36b is oriented at a first angle α relative to central section 36a. Second section 36c extends from a second end of central section 36a to proximate second end 12b of dewatering unit 12. Second section 36c is oriented at a second angle β relative to central section 36a. The second angle β is shallower than the first angle α and therefore second section 36c is a gentler slope than is first section 36b. This generally U-shaped bottom 12d of dewatering unit 12 tends to channel water into the central section 36a and thereby over grates 25a and screens 34.

As is evident from FIGS. 4A-4C, conveyor assembly 24 is shaped similarly to the lower region of the body. Conveyor assembly 24 includes a central portion 26A located vertically above central section 36a of the dewatering unit's body, a first portion 26B that is located vertically above first section 36b of the dewatering unit's body, and a second portion 26C that is located vertically above second section 36c of the dewatering unit's body. In other words, the conveyor assembly 24 is also generally U-shaped when viewed from the side. Conveyor assembly 24 passes around idler sprockets 38a, 38b (FIGS. 4A, 4B) are provided adjacent the regions where first section 36b joins central section 36a and where second section 36c joins central section 36a.

It should be noted that the angle α is steeper than the angle β. Additionally, the first section 36b of the dewatering unit's body and therefore the first portion 26B of conveyor assembly 24 is shorter than the second section 36c of the dewatering unit's body and therefore than the second portion 26C of conveyor assembly 24. The steeper angle α and the shorter first portion 26B of the conveyor assembly 24 helps to ensure that petcoke material dropping through the bores 18c of connector members 18 will be directed onto the central portion 26A of conveyor assembly 24 and then move subsequently onto the second portion 26C thereof. The shallower angle β and longer second portion 26C of the conveyor assembly helps to ensure that more water will tend to drain out through the spaces 30 between the drag bars 28 on the conveyor assembly 24 and thereby through screens 34.

In accordance with another aspect of the present disclosure, one or more openings are defined in the first side 12e and second side 12f of the body of dewatering unit 12. Vertically-oriented screens 40 are positioned within the openings in first side 12e and second side 12f. The screens 40 include a plurality of openings that place interior chamber 12g in fluid communication with the air outside of the dewatering unit 12. Consequently, when the petcoke/water mixture flows into interior chamber 12g of dewatering unit 12, some of the water in the mixture will flow through the vertically-oriented screens 40 in addition to the spaces 30 between drag bars 28 and the horizontally-oriented screens 34. Screens 40 therefore help to permit more rapid dewatering of the petcoke material in chamber 12g. If a sluice is provided below screens 34, screens 40 may be positioned such that water flowing therethrough will be directed downwardly into the sluice. Although not illustrated herein, it will be understood that doors may be provided on first side 12e and second side 12f to selectively close off the screens 40 so that water cannot flow out of interior chamber 12g therethrough. As best seen in FIG. 6, each screen 40 is substantially V-shaped when viewed from above. This shape provides additional surface area relative to a planar screen and therefore provides even more openings for water to flow out of interior chamber than would be possible if the screens were planar. It will be understood that in other examples planar screens will be used. Alternatively, a plurality of V-shaped screens and planar screens may be utilized.

The panels used for screens 34 and 40 preferably are fabricated from a stainless steel material that is continuous TIG welded and is hard chrome wear-plated to help ensure strength and dependability of the screens This construction also helps to ensure that the screens 34, 40 are capable of taking impacts from large blocks of petcoke material while allowing water to dissipate therethrough. The materials and construction also helps to extend the life of screens 34, 40. It will be understood that screens 34, 40 are removable so that they may be repaired or replaced as necessary.

In accordance with a further aspect of the present disclosure, one or more baffle plates 42 (FIGS. 4A and 5) are provided on the interior surfaces of first side 12e and second side 12f. In particular, baffle plates 42 may be located inwardly of screens 40 and includes slots 42a that allow water to flow therethrough and toward screens 50. Baffle plates 42a are utilized to help to deflect petcoke material away from screens 40 and therefore aid in helping to reduce buildup of petcoke material thereon. Baffle plates 42 may therefore aid in preventing blockage of screens 40. Additional baffle plates 42 may be provided on other areas of the interior surface of first side 12e and second side 12f (other than above screens 40) to help reduce the tendency for petcoke fines to build up thereon.

One or more crushers/pick breakers 44 (FIGS. 4C, 7C) are mounted in dewatering unit 12 in a position where they will contact and crush or break material traveling up second portion 26C of conveyor assembly 24. Pick beaker 44 or crusher may be located anywhere along the length of second portion 26C. Pick breaker 44 may be rotated about a transverse axis by a motor 46 (FIG. 3C) so as to crush and breaker larger petcoke material blocks into smaller pieces as the blocks travel up second portion 26C. Pick breaker 44 is of a heavy duty steel construction and includes AP style bearings and replaceable hard-faced bits. Pick breaker 44 may be configured to reduce the feed size of material traveling up conveyor assembly 24 to a size of from about 6 inches up to about 8 inches in size.

A breaker cleaner 48 (FIG. 4C) is mounted adjacent pick breaker 44 to clean petcoke materials from pick breaker 44 so as to ensure petcoke materials don't become lodged in pick breaker 44 and thereby reduce the pick breaker's effectiveness. The breaker cleaner 48 is configured to free the pick breaker 44 of material buildup jammed between the throws of pick breaker 44. It will be understood that another pick breaker and breaker cleaner may be located on first portion 26B of conveyor assembly 24 and or on central portion 26A thereof.

In accordance with another aspect of the present disclosure, dewatering unit 12 includes a translation mechanism for moving the dewatering unit from one location to another. In dewatering unit 12, that translation mechanism comprises one or more rail bogies 50 (FIGS. 2A and 2C) that are operably engaged with the unit's body and are used to move dewatering unit 12 along rail tracks "RT". Rail bogies 50 may be of any suitable construction that will allow dewatering unit 12 to be moved in a first direction or a second direction along rail tracks "RT". In this first embodiment, dewatering unit 12 may include motors to drive bogies 50. In other instances, bogies 50 may draw their power from rail tracks "RT" or from any other suitable source.

In accordance with another aspect of the present disclosure, dewatering unit 12 includes a plurality of stabilizing assemblies 52 (FIG. 2B). Stabilizing assemblies 52 may be provided at intervals along any region of dewatering assembly 12 that is suitable for stabilizing assemblies 52 to contact the ground on either side of rail tracks "RT" when deployed. In some example, stabilizing assemblies 52 are provided at spaced-intervals longitudinally from each other on one or both of first side 12e and second side 12f of the dewatering unit's body. Additionally, stabilizing assemblies may be provided at laterally-spaced apart intervals from each other along first side 12e and second side 12f. In this way, at least some of the weight of dewatering unit 12 may be collectively borne by stabilizing assemblies 52 (as described hereafter) in a balanced manner and such that the weight of dewatering unit 12 is distributed generally equally to all of the plurality of stabilizing assemblies. Stabilizing assemblies 52 also aid in lifting some of the weight of the dewatering unit off of the rail tracks "RT".

As best seen in FIG. 2B, stabilizing assemblies 52 include a housing 52a that is fixedly engaged within first side 12e or second side 12f of the dewatering unit's body, for example. A footing 52b is movably secured to housing 52a and an actuator 52c is engaged with housing 52a and footing 52b. The actuator 52c may be a hydraulic cylinder, a pneumatic cylinder, an electrical cylinder, or any other component that is able to move footing 52*b* upwardly and downwardly relative to the housing 52*a*. FIG. 2B shows a first stability assembly 52 in a retracted position where the footing 52*b* is withdrawn upwardly toward bottom 12*d* of dewatering unit 12. FIG. 2B also shows a second stabilizing assembly 52 in a deployed state (or extended position) where the footing 52*b* is in contact with the ground "GS". When actuator 52*c* is activated in a first instance, footing 52*b* is moved downwardly and outwardly from housing 52*a* until a lower plate 52*d* thereof contacts the ground "GS". In a second instance, footing 52*b* is moved upwardly and inwardly toward housing 52*a* until lower plate 52*d* is lifted clear off the ground "GS". The actuators 52*c*, housing 52*a*, and footing 52*b* are of robust construction as their primary function is relieving the weight of dewatering unit 12 from rail tracks "RT". Stabilizing assemblies 52 will be moved to a retracted or un-deployed position (lower plate 52*d* out of contact with ground "GS") when dewatering assembly 12 is to be moved from a first location to a second location along rail tracks "RT". When the desired second location is reached, stabilizing assemblies 52 may be moved to an extended or deployed position (lower plate 52*d* contacting the ground "GS"). When some or all of the plurality of stabilizing assemblies 52 are moved to the extended position, at least some of the weight of dewatering assembly 12 (plus the weight of any petcoke/water mixture retained therein) is borne by stabilizing assemblies 52 instead of or as well as by rail tracks "RT". It is therefore useful to be able to deploy the plurality of stabilizing assemblies 52 when petcoke/water mixture is being loaded into chamber 12*g* from coking drums 10, for example.

Although not illustrated herein, dewatering unit 12 may include a hitch assembly that enables the unit to be engaged with a powered vehicle to move the unit along rail tracks "RT". In other instances, bogies 50 may include an onboard processor programmed to control movement of dewatering unit 12. Dewatering unit 12 may further be provided with a processor in locations other than on bogies 50 that includes programming that may be accessed remotely by an operator to operate dewatering unit 12. The operator may control a plurality of different functions including but not limited to raising and lowering connector members 18, opening and closing doors (not shown) that cover screens 40, actuating the conveyor assembly 24, actuating the pick breaker(s) 44, actuating bogies 50, and actuating stabilizing assemblies 52. Alternatively or additionally, a control panel may be provided at any suitable location on the body of dewatering unit 12. The control panel may include switches, buttons etc. that enable operator to start and stop operation of any driven component within dewatering unit 12. Dewatering unit 12 may also be provided with various sensors that are operatively engaged with an onboard processor, with the control panel or with a remote computer. The sensors may include proximity sensors (that determine, for example, if the connector members 18 are aligned properly with the chute 10*a* of a coking oven 10); sensors that determine if the interior chamber 12*g* is filled to a predetermined limit, sensors that determine if the pick breaker(s) 44 are jammed, if the conveyor assembly 24 is stopped etc. Emergency shut-offs may also be operatively engaged with the various driven systems.

Referring to FIGS. 1 and 7A-7C, dewatering unit 12 is used in the following manner. The unit 12 is moved as indicated by arrows "A" (FIG. 7A) to a position underneath coking ovens 10 (FIG. 1) by activating bogies 50 to travel along rail tracks "RT to the desired position. When connector members 18 are correctly positioned so as to be aligned with the chutes 10*a* of coking ovens, stabilizing assemblies 52 are deployed by moving them in the direction of arrow "B" (FIG. 2B) as previously described so that the weight of the dewatering unit 12 is at least partially lifted off the rail tracks "RT".

Figure 7A:
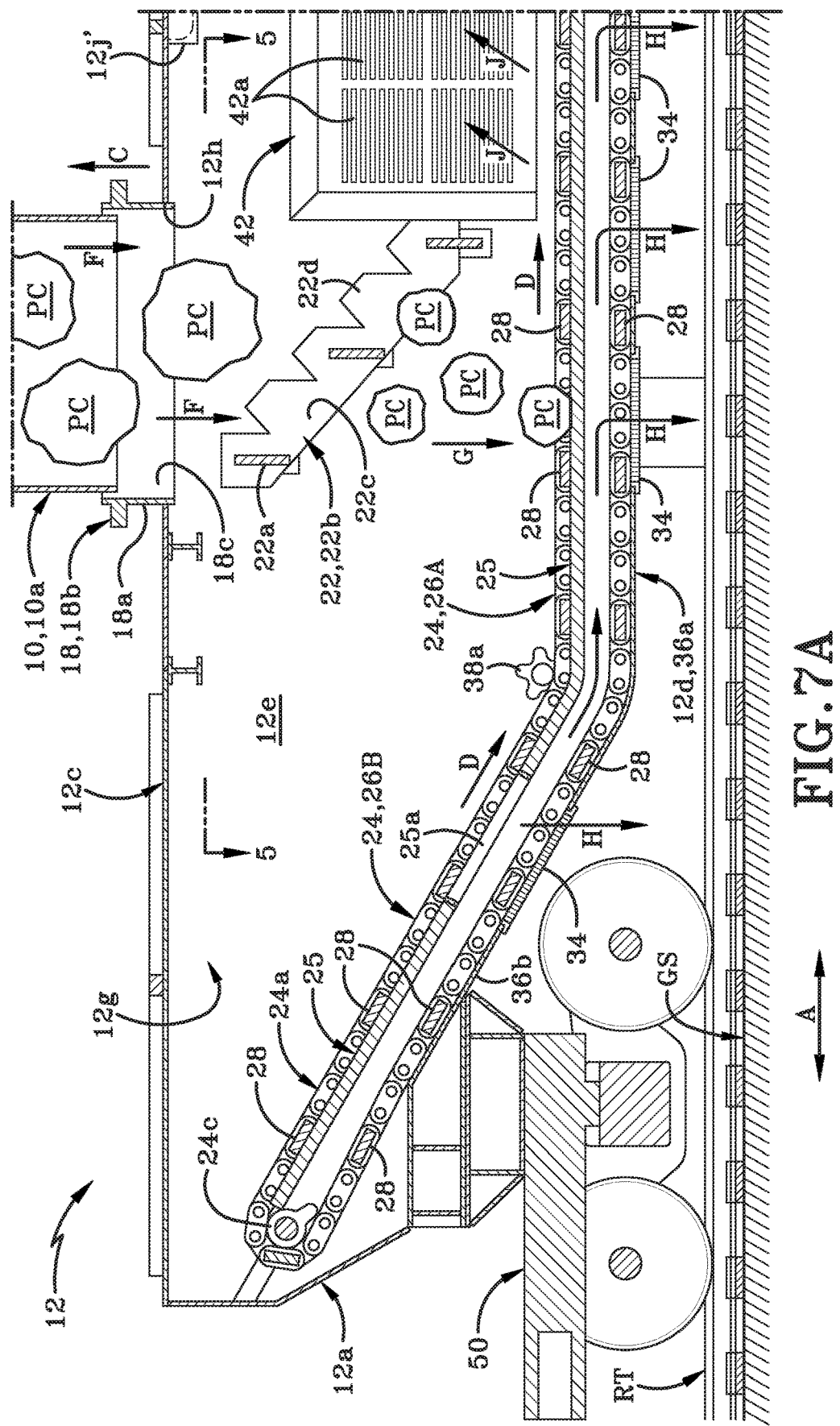
FIG. 7A is a longitudinal cross-section of the first end of the dewatering unit showing separation of coke and water therein.
Figure 7B:
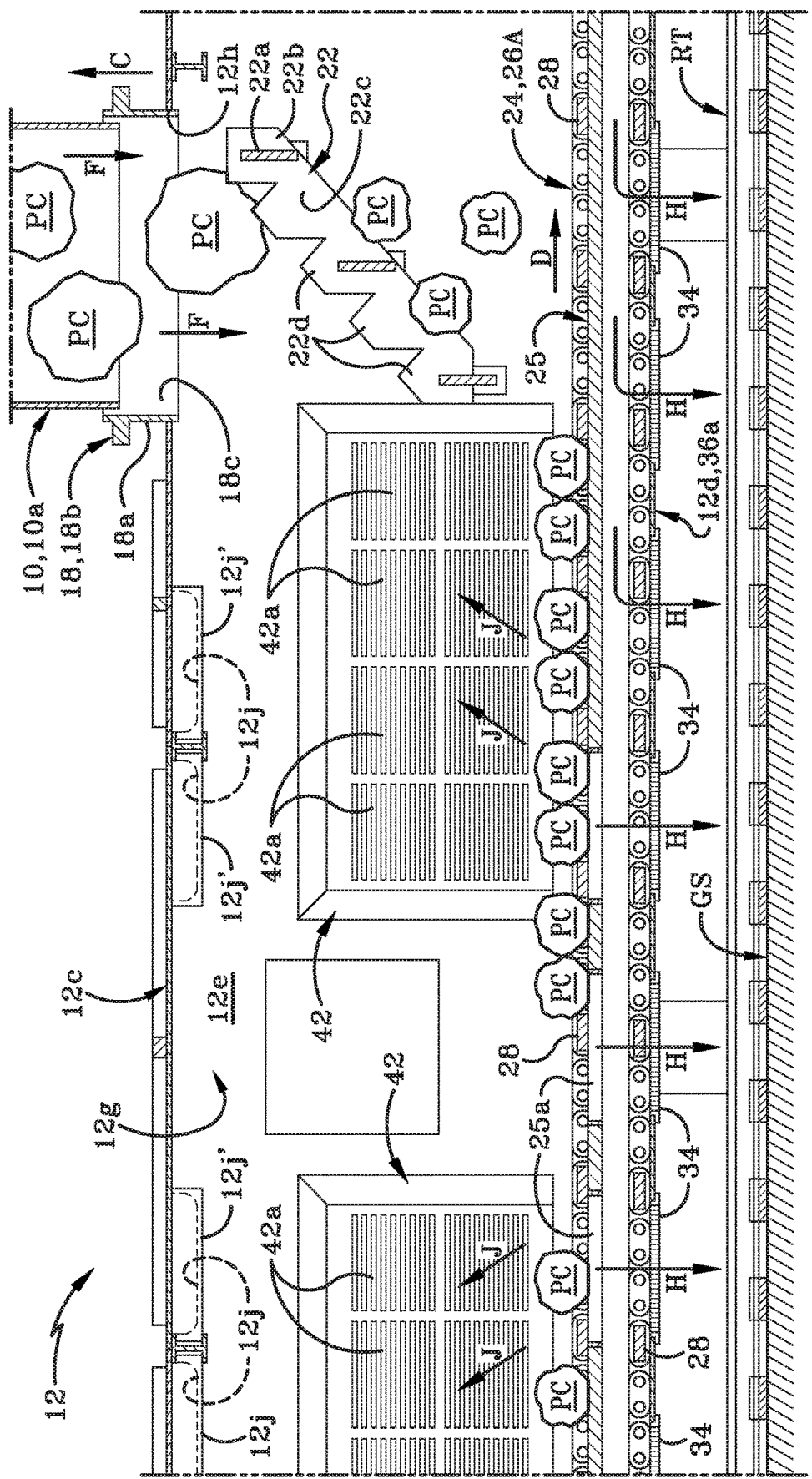
FIG. 7B is a longitudinal cross-section of the middle region of the dewatering unit showing separation of coke and water therein.

Actuators 20 are then activated to raise connector members 18 in the direction of arrow "C" (FIG. 7A) to each receive at least a portion of the associated chute 10*a* of coking oven 10 therein. Motors 32 and 46 are activated to initiate movement in conveyor assembly 24 in the direction indicated by arrow "D" (FIG. 7A) and to rotate pick breaker 44 in the direction indicated by arrow "E" (FIG. 7E). Valves 10*b* on coking ovens 10 are moved to the open position and a quantity of chunks of petcoke "PC" mixed with a volume of water drops out of coking ovens 10 and into interior chamber 12*g* of dewatering unit 12 as indicated by arrow "F" (FIG. 7A). As the chunks/blocks of petcoke "PC" travel out of the bores 18*c* of connector members 18, the chunks/blocks of petcoke "PC" will strike the grizzly 22 located directly below the associated connector member 18 and will be at least partially fractured as they drop downwardly hitting the bars 22*a*, crossbars 22*c*, and teeth 22*d* and fall through spaces 22*c* and bounce off the grizzly 22.

The somewhat fractured petcoke blocks "PC" will fall downwardly in the direction indicated by arrow "G" onto the drag bars 28 and be further fractured thereby. The water will drop through the spaces 30 between drag bars 28 in the direction indicated by the arrows "H" and through the openings in the screens 34 and into a sluice. The further-fractured petcoke blocks "PC" will start traveling along with conveyor assembly 24 in the direction "D" toward second end 12*b* of dewatering unit 12. As the petcoke blocks travel up the second portion 26C of conveyor assembly 24 they will be contacted and be further broken down by the rotating pick breaker 44. If some of the petcoke material becomes lodged between the flights of pick breaker 44, the breaker cleaner 48 will remove the same.

Water flowing through screens 34 will be directly toward first end 12*a* of dewatering unit 12 is provided with a sluice. Alternatively, the water will flow directly downward from bottom 12*d* of unit 12. Since the openings in the screens 34 are relatively small and the quantity of water and petcoke flowing into the dewatering unit 12 is large, the water/petcoke material will start to fill the interior chamber 12*g*. If the doors (not shown) covering screens 40 in first and second side 12*e*, 12*f* have not yet been opened, they will now be opened. Water will begin to flow out of interior chamber 12*g* through the screens 40 as indicated by the arrows "J" and thereby drain the interior chamber 12*g* substantially faster than if only screens 34 are used on their own. Water flowing out of screens 40 may flow into the same sluice as the water from screens 34. If no sluice is provided, the water will flow downwardly over the lower regions of one or both of the first side 12*e* and second side 12*f*. It should be noted that any water spilling out from the chutes 10*a* of coking ovens 10 or overflowing from connection members 18 onto the exterior of the dewatering unit 12 will flow into weirs 12*j* and drain downwardly into interior chamber 12*g*.

Figure 7C:
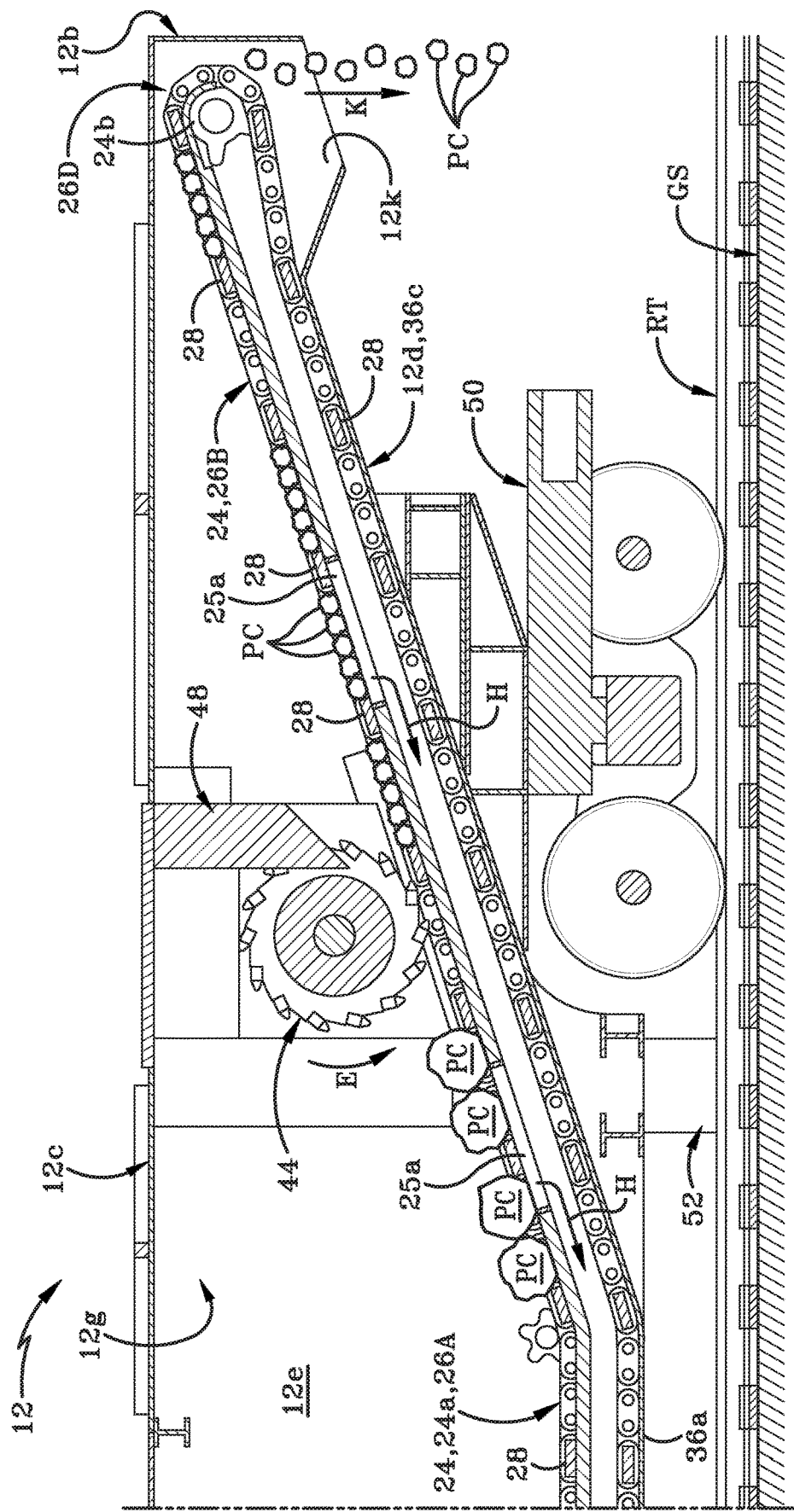
FIG. 7C is a longitudinal cross-section of the second end of the dewatering unit showing separation of coke and water therein.

Petcoke blocks "PC" that have been reduced in size by pick breaker 44 will reach the uppermost end 26D (FIG. 7C) of conveyor assembly 24 and will drop downwardly out of an exit opening 12*k* defined in second end 12*b* of dewatering unit 12. The petcoke blocks "PC" will drop out of the dewatering unit 12 in the direction indicated by arrow "K" (FIG. 7C). The petcoke blocks may be dropped into a secondary dewatering unit 14 (FIG. 1) or into a truck 16, into a pit, onto the ground or into any other type of desired receptacle.

Figure 8:
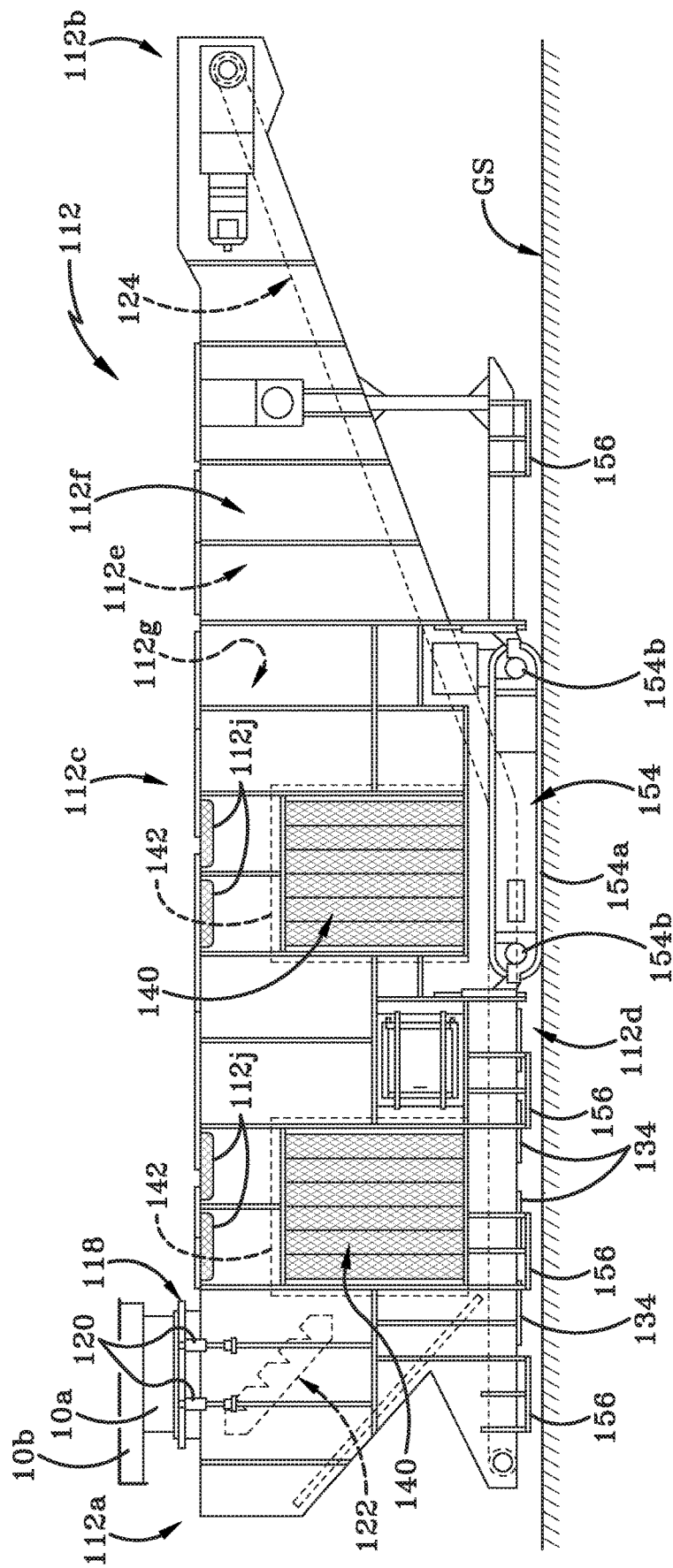
FIG. 8 is a longitudinal cross-section through a second embodiment of a dewatering unit in accordance with the present disclosure.

Referring now to FIG. 8, a side elevation of a second embodiment of a dewatering unit in accordance with the present disclosure is illustrated and is generally indicated at 112. Dewatering unit 112 comprises a body having a first end 112a, a second end 112b (FIG. 2C, a top 112c, a bottom 112d, a first side 112e, and a second side 112e. First end 112a and second end 112b define a longitudinal direction between them and a central longitudinal axis extends between first end 112a and second end 112b. Top 112c and bottom 112d define a vertical direction therebetween. The first side and the opposed second side 112f define a lateral or transverse direction therebetween. First end 112a of dewatering unit 112 may be substantially vertical instead of angled simply because first end 112a does not have to be shaped to accommodate a bogie 50, as will be later described herein.

First end 112a, second end 112b, top 112c, bottom 112d, the first side 112e, and the opposed second side 112f bound and define an interior chamber 112g. Dewatering unit 12 is illustrated as defining two openings 12h in top 12c that are in fluid communication with interior chamber 12g. By contrast, dewatering unit 112 defines only one opening in the top 112c that is substantially identical in structure and function to opening 12h and is in fluid communication with interior chamber 112g. Dewatering unit 112 is also provided with one or more overflow weirs 112j in top 112c that are of substantially the same structure and function as overflow weirs 12j. An exit opening similar to exit opening 12k is also provided proximate second end 112b of dewatering unit 112.

A connector member 118 is provided to limit access through the opening into interior chamber 112g. The connector member 118 is substantially identical in structure and function to connector member 18. One or more actuators 120 are operably engaged with connector member 118 and with a portion of the top 112c or first or second sides of dewatering unit 112. Actuators 120 are selectively operable to selectively raise and lower connector member 118 in the same manner and for the same purpose as actuators 20 with respect to connector members 18.

A grizzly 122 is positioned a distance vertically below a bottom end of connector member 118. Grizzly 122 is of substantially the same structure and function as grizzlies 22. A conveyor assembly 124 is provided in dewatering unit 112 that is of substantially the same overall structure and the same function as conveyor assembly 24 except that the shape and size thereof may be slightly different from conveyor assembly 24. In accordance with another aspect of the present disclosure, one or more openings are defined in the first side and opposed second side 112f of the body of dewatering unit 112. Vertically-oriented screens 140 are positioned within the openings. The screens 140 include a plurality of openings that place interior chamber 212g in fluid communication with the air outside of the dewatering unit 112. Baffle plates 142 substantially identical baffle plates 42 are provided on the interior surfaces of the first side 112e and second side 112f. In particular, baffle plates 142 may be located above screens 140 and are utilized to help to deflect petcoke material away from screens 140. Dewatering unit also includes screens 134 in bottom 112d.

Dewatering unit 112 is substantially identical in all other respects in regard to structure and function to dewatering unit 12 except for the type of translation mechanism that is utilized. In dewatering unit 112 instead of having bogies 50 as the translation mechanism to move the dewatering unit from one location to another, dewatering unit 112 is provided with a translation mechanism in the form of a crawler assembly 154. Crawler assembly 154 includes a track 154a that travels around longitudinally spaced-apart and transversely oriented axles 154b. Crawler assembly 154 permits dewatering unit 112 to move in substantially any direction across the ground. Bogies 50, on the other hand, require rail tracks 50 and therefore can only move the dewatering unit 12 in specific directions and to specific locations. Dewatering unit 112 as illustrated also differs from dewatering unit 12 in that the stabilizing assemblies 52 are omitted therefrom. In one example, the crawler assembly 154 may be vertically raiseable relative to bottom 112f of unit 112 and in this instance, support pads 156 provided on bottom 112f may contact the ground surface "GS' and hold bottom 112f a short distance above the ground surface "GS". In other examples, however, stabilizing assemblies similar to stabilizing assemblies 52 may be included on dewatering unit 112 instead of the pads 156. These stabilizing assemblies may be utilized to lift weight off crawler 154. Crawler 154 may be selectively raised if the stabilizing assemblies are deployed.

Although not illustrated herein, dewatering unit 112 may also include a staircase that enables an operator to gain access to top 112c.

It will be understood that dewatering unit 12 or dewatering unit 112 may be provided with any other suitable mechanism or equipment other than bogies 50 or crawler assembly 154 that will enable the unit to be moved from one location to another.

Figure 9:
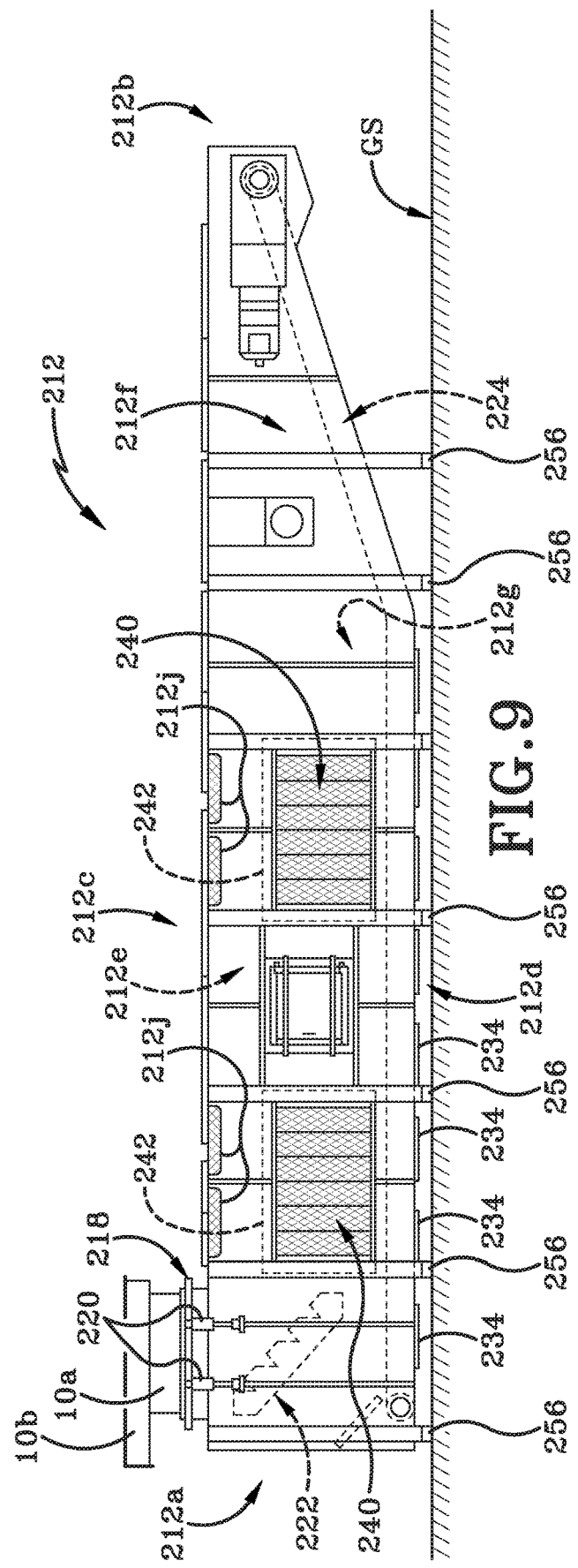
FIG. 9 is a longitudinal cross-section through a third embodiment of a dewatering unit in accordance with the present disclosure.

Referring now to FIG. 9, there is shown a side elevation of a third embodiment of a dewatering unit in accordance with the present disclosure, generally indicated at 212. Dewatering unit 212 comprises a body having a first end 212a, a second end 212b (FIG. 2C, a top 212c, a bottom 212d, a first side 212e, and a second side 212e. First end 212a and second end 212b define a longitudinal direction between them and a central longitudinal axis extends between first end 212a and second end 212b. Top 212c and bottom 212d define a vertical direction therebetween. The first side 212e and the opposed second side 212f define a lateral or transverse direction therebetween. First end 212a, second end 212b, top 212c, bottom 212d, the first side 212e, and the opposed second side 212f bound and define an interior chamber 212g. First end 212a of dewatering unit 212 may be substantially vertical instead of angled simply because first end 212a does not have to be shaped to accommodate a bogie 50, as will be later described herein.

Dewatering unit 212 is illustrated as defining only one opening in top 12c that is in fluid communication with interior chamber 212g. It will be understood, however, that two or more openings may be defined therein, similar to dewatering unit 12. Dewatering unit 212 is also provided with one or more overflow weirs 212j in top 112c that are of substantially the same structure and function as overflow weirs 12j. An exit opening similar to exit opening 12k is also provided proximate second end 212b of dewatering unit 212.

A connector member 218 is provided to limit access through the opening into interior chamber 212g. The connector member 218 is substantially identical in structure and function to connector member 18. One or more actuators 220 are operably engaged with connector member 218 and with a portion of the top 212c or first or second sides of dewatering unit 212. Actuators 220 are selectively operable to selectively raise and lower connector member 218 in the same manner and for the same purpose as actuators 20 with respect to connector members 18.

A grizzly 222 is positioned a distance vertically below a bottom end of connector member 218. Grizzly 222 is of substantially the same structure and function as grizzlies 22. A conveyor assembly 224 is provided in dewatering unit 212 that is of substantially the same overall structure and the same function as conveyor assembly 24 except that the shape and size thereof may be slightly different from conveyor assembly 24. In accordance with another aspect of the present disclosure, one or more openings are defined in the first side 212e and opposed second side 212f of the body of dewatering unit 212. Vertically-oriented screens 240 are positioned within the openings in the first and second sides. The screens 240 include a plurality of openings that place interior chamber 212g in fluid communication with the air outside of the dewatering unit 212. Baffle plates 242 substantially identical baffle plates 42 are provided on the interior surfaces of the first side 212e and second side 212f. In particular, baffle plates 242 may be located above screens 240 and are utilized to help to deflect petcoke material away from screens 240. Dewatering unit also includes screens 234 in bottom 212d.

Dewatering unit 212 is substantially identical in all other respects in regard to structure and function to dewatering unit 12 except that instead of having bogies 50 or a crawler assembly 154 to move the dewatering unit from one location to another, dewatering unit 212 is designed to simply rest upon the ground and remain stationary, i.e., in one location. Bottom 212d may rest directly on the ground "GS" but in other instances, as illustrated in FIG. 9, a plurality of footings 256 may contact the ground "GS" and hold bottom 212d a short distance above the ground. In other examples, however, stabilizing assemblies similar to stabilizing assemblies 52 may be included on dewatering unit 212 instead of the footing 256. These stabilizing assemblies may be utilized to support the weight of dewatering unit 212 and help raise the dewatering unit 212 to a desired height off ground surface "GS".

It will be understood that dewatering unit 212 may have an exterior shape that is slightly different to the shape of the body illustrated in FIG. 9. For example, dewatering unit 212 may be configured to be identical in shape to either of dewatering unit 12 or dewatering unit 112 but will not include the bogie 50 or crawler assembly 154 because dewatering unit 212 is not designed to be mobile. Dewatering unit 212 lacks any type of mechanism that will enable it to move from one location to another. In some examples, dewatering unit 212 may be built into a supporting structure that will maintain dewatering unit 212 in a fixed location. In this instance, the petcoke/water mixture has to be delivered to dewatering unit 212 instead of the dewatering unit being moved to a coking drum or coking tower as is the case with dewatering units 12 and 112. (It will of course be understood that in other examples, petcoke/water mixtures may be delivered to dewatering units 12 or 112 if the dewatering unit is moved to some type of terminal that includes a conveying mechanism that transfers the petcoke/water mixture to a hopper of some type.

It will further be understood that when water drains into a sluice provided on or adjacent to dewatering unit 12 or 112, the water may accumulate therein until a certain capacity is reached. The dewatering unit 12 or 112 may then be moved to a location where the accumulated water is removed from the sluice for further processing or recycling. In the dewatering unit 212, the sluice therein may be permanently placed in fluid communication with some type of drainage system that diverts the water draining from the dewatering unit 212 for further processing or recycling.

Figure 10:
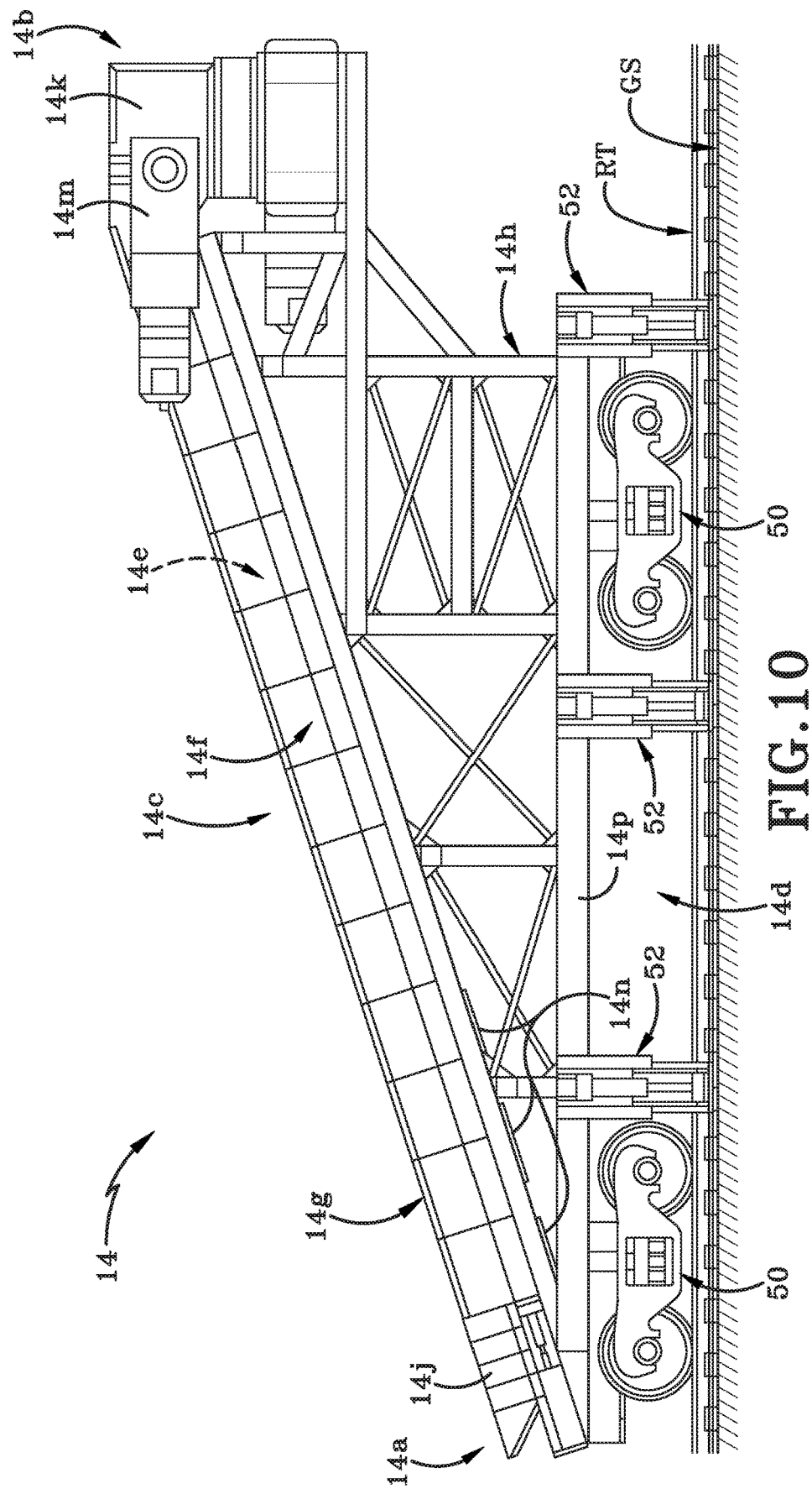
FIG. 10 is a side elevation view of the secondary dewatering unit shown in FIG. 1.

As indicated earlier herein, each of the dewatering units 12, 112, 212 has a discharge or exit opening at the second end thereof, such as exit opening 12k at second end 12b of dewatering unit 12. Dewatered petcoke travels up the conveyor assembly 24, is crushed to an initially desired size by pick breaker 44 and then exits dewatering unit 12 through the discharge/exit opening 12k. The dewatered petcoke product may then be further processed or utilized. In some instances, the dewatered petcoke product exiting any of the dewatering units 12, 112, 212 may not be quite dry enough in that it still includes too much water. In this instance, the dewatered petcoke product may be moved through secondary dewatering unit 14 shown in FIGS. 1 and 10. Referring to FIG. 10, secondary dewatering unit 14 includes a housing that has a first end 14a, a second end 14b, a top 14c, a bottom 14d, a first side 14e, and an opposed second side 14f. Secondary dewatering unit 14 defines an elongate chute 14g that is mounted on a frame 14h such that the chute 14g is oriented at an angle. Frame 14h is supported on one or more bogies 50 substantially similar to the bogies 50 on dewatering unit 12. Stabilizing assemblies 52 may also be provided on secondary dewatering unit 14.

Chute 14g includes an intake 14j at a lower end and an outlet 14k at a higher end. Intake 14j includes an opening on an upper surface thereof such that dewatered petcoke product from dewatering unit 12 or 112 or 212 may drop into the intake 14j. A conveyor assembly similar in structure to conveyor assembly 24 is provided in chute 14g to move dewatered petcoke product from intake 14j to outlet 14k. Because chute 14g is similar a rectangular cube in shape with a hollow channel passing from intake 14j to outlet 14k, the conveyor assembly provided therein will be similar in configuration to the second portion 26C of the conveyor 24 in dewatering unit 12. A plurality of screens 14n is positioned below at least a portion of the conveyor assembly 24 provided in secondary dewatering unit 14. Water that drains off of the already previously dewatered (but not fully dewatered) end product will flow downwardly along an interior surface of the bottom wall of the chute 12g until it reaches screens 14n. The water will then drain through screens 14n and into a sluice, such as sluice 14p below chute 14g. One or both of the intake 14j and the outlet 14k may comprise a driven crusher unit that will further break down petcoke fed into the intake 14j. FIG. 10 illustrates a secondary dewatering unit 14 having a crusher unit at the outlet 14k and being driven by a motor 14m. Preferably, the crusher unit has high throughput capacity and is of a type that is robust and requires little maintenance. The crusher unit may be customized to produce any desired size end product. The crusher unit may include a direct drive with torque-limiting devices and may have a variable frequency drive (VFD). Additionally, the crusher unit may have large bearings and excellent seal arrangements. The hoppers on the crusher unit may be lined with CCO or AR400 to give the unit a long life. The bits on the crushers in the crusher unit may be carbide tipped.

After processing by secondary dewatering unit, the now additionally dewatered petcoke will drop out of an opening defined in the outlet 14k and into a truck 16 (FIG. 1) or into a pit, or onto the ground, or into another receptacle.

It will be understood that utilizing appropriately sized and constructed grizzly assemblies 22, 122, 222, pick breakers 44 and/or crushers, petcoke processed by dewatering units 12, 112, 212 and possibly additionally by secondary dewatering unit 14 and any crusher units thereon, may be broken down to a desired end product size with a desired water content. It will be understood that more than one secondary dewatering unit may be utilized as part of the dewatering system illustrated in FIG. 1.

Dewatering units 12, 112, 212 disclosed herein aid in removing the need for operators and other personnel to work under or near coking ovens 10. This increases workplace safety since hot petcoke which is transferred from coking ovens 10 to any of the dewatering unit 12, 112, 212 is contained within the interior chamber 12g, 112g, 212g at all times through the dewatering processes. This arrangement also helps to ensure that operators and other personnel have less exposure to contaminants within the material being processed. Additionally, all actuated gate valves, level sensors and zero speed switches may be provided on the dewatering units 12, 112, 212 in located that ensure that operators are not near the equipment performing the dewatering and resizing of the petcoke material. Additionally, the dewatering units 12, 112, 212 disclosed herein tend to have large containment tanks (i.e., interior chambers 12g) and this helps to reduce spillage from possible blowouts.

It will be understood that dewatering units 12, 112, 212 (along with the secondary dewatering unit secondary dewatering unit 14) are custom engineered to receive feed from coking ovens 10, size the feed to the desired end-product specification, and transport the product to the desired location, thereby eliminating unnecessary additional handling. The dewatering units 12, 112, 212 and second dewatering unit secondary dewatering unit 14 may be utilized to load rail cars, trucks, storage bins, and/or dump product onto containment pads etc. The majority of the water used to remove petcoke from coking oven 10 is removed from the petcoke utilizing the dewatering units 12, 112, 212 and secondary dewatering unit secondary dewatering unit 14. The pick breakers and crusher units also help to remove an additional quantity of water from the petcoke material. Sizing of the petcoke material during the dewatering process through the use of grizzlies 22, 122, 212, pick breakers such as pick breaker 44, and crusher units (such as those on secondary dewatering unit 14) also presents multiple benefits in that no additional handling is required to get the petcoke to a desired size specification. The grizzlies and pick breakers help to process a drier petcoke product into any secondary dewatering unit secondary dewatering unit 14 than would be the case if the petcoke product was not being broken down in size during dewatering in dewatering units 12, 112 or 212.

It will be understood that while the dewatering units 12, 112, 212 and secondary dewatering unit 14 disclosed herein have been discussed with respect to coking drums and production of petcoke, these units may be utilized with any other type of product that requires dewatering and sizing. If any other product does not require resizing, then the grizzlies, pick breakers and crusher units may be omitted from the dewatering system.

Additionally, the dewatering units 12, 112, 212, and secondary dewatering unit 14 disclosed herein tend to contain the vast majority of fines that normally escape in a dewatering process and return to jet tank pumps. The units 12, 112, 212, and secondary dewatering unit 14 thereby reduce the number of man-hours typically required to reclaim and handle fines and also help to extend the life of jet pumps.

The configuration of units 12, 112, 212, and secondary dewatering unit 14 is such that the pick breaker, crusher unit, and conveyor assembly components are readily accessible for maintenance purposes and this tends to reduce the amount of downtime required to maintain the machines. As discussed earlier herein, the screen panels 34a, 40 may be installed using bolts and therefore can easily be removed for maintenance purposes.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−12% of the stated value (or range of values), etc. Any numerical range recited herein is intended to include all sub-ranges subsumed therein.

Additionally, any method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A dewatering unit comprising:
a body having a first end, a second end, a first side, a second side, and a bottom that bound and define an interior chamber;
a conveyor assembly provided in the interior chamber and adapted to move articles toward the second end;
at least one first screen positioned below the conveyor assembly;
at least one second screen provided in one or both of the first side and the second side; wherein the at least one first screen and the at least one second screen are adapted to permit liquid to pass therethrough; and
a baffle plate positioned between the at least one second screen and the interior chamber.

2. The dewatering unit according to claim 1, further comprising one or more stabilizing assemblies engaged with one or both of the first side and the second side; wherein each stabilizing assembly is movable between a retracted position and an extended position, and when in the extended position, a footing of the stabilizing assembly is adapted to contact a ground surface below the body.

3. The dewatering unit according to claim 2, wherein each of the one or more stabilizing assemblies includes an actuator that moves the footing between the retracted position and the extended position.

4. The dewatering unit according to claim 1, further comprising a translation mechanism adapted to move the body across a ground surface.

5. The dewatering unit according to claim 4, wherein the translation mechanism comprises one or more rail bogies positioned below the bottom of the body, said one or more rail bogies being adapted to move the body along rail tracks.

6. The dewatering unit according to claim 4, wherein the translation mechanism comprises a crawler assembly.

7. A dewatering unit comprising:
a body having a first end, a second end, a first side, a second side, and a bottom that bound and define an interior chamber;
a conveyor assembly provided in the interior chamber and adapted to move articles toward the second end;
at least one first screen positioned below the conveyor assembly; and
at least one second screen provided in one or both of the first side and the second side;
wherein the at least one first screen and the at least one second screen is adapted to permit liquid to pass therethrough; and
wherein each of the at least one second screen is V-shaped when viewed from above.

8. The dewatering unit according to claim 7, further comprising one or more stabilizing assemblies engaged with one or both of the first side and the second side; wherein each stabilizing assembly is movable between a retracted position and an extended position, and when in the extended position, a footing of the stabilizing assembly is adapted to contact a ground surface below the body.

9. The dewatering unit according to claim 7, further comprising a translation mechanism adapted to move the body across a ground surface, wherein the translation mechanism comprises one or more rail bogies positioned below the bottom of the body, said one or more rail bogies being adapted to move the body along rail tracks.

10. A dewatering unit comprising:
a body having a top, a bottom, a first end, a second end, a first side, and a second side that bound and define an interior chamber;
at least one opening defined in the top, wherein the at least one opening is adapted to permit a mixture of a solid material and to be placed into the interior chamber;
at least one connector member operatively engaged with the top adjacent the at least one opening; said at least one connector member defining a bore therethrough, and
at least one actuator operably engaged with the at least one connector member, said at least one actuator being operable to move the at least one connector member between a raised position and a lowered position relative to the top;
a conveyor assembly provided in the interior chamber and adapted to move articles toward the second end;
at least one first screen positioned below the conveyor assembly; and
at least one second screen provided in one or both of the first side and the second side; wherein the at least one first screen and the at least one second screen is adapted to permit liquid to pass therethrough.

11. The dewatering unit according to claim 10, further comprising a grizzly provided below the at least one opening.

12. The dewatering unit according to claim 10, further comprising one or more stabilizing assemblies engaged with one or both of the first side and the second side; wherein each stabilizing assembly is movable between a retracted position and an extended position, and when in the extended position, a footing of the stabilizing assembly is adapted to contact a ground surface below the body.

13. The dewatering unit according to claim 10, further comprising a translation mechanism adapted to move the body across a ground surface, wherein the translation mechanism comprises one or more rail bogies positioned below the bottom of the body, said one or more rail bogies being adapted to move the body along rail tracks.

14. A dewatering unit comprising:
a body having a top, a bottom, a first end, a second end, a first side, and a second side, that bound and define an interior chamber;
a conveyor assembly provided in the interior chamber and adapted to move articles toward the second end;
at least one first screen positioned below the conveyor assembly; and
at least one second screen provided in one or both of the first side and the second side; wherein the at least one first screen and the at least one second screen is adapted to permit liquid to pass therethrough;

at least one overflow weir defined in one or both of the first side and second side proximate the top of the body; and a screen provided in the at least one overflow weir.

15. The dewatering unit according to claim 14, further comprising one or more stabilizing assemblies engaged with one or both of the first side and the second side; wherein each stabilizing assembly is movable between a retracted position and an extended position, and when in the extended position, a footing of the stabilizing assembly is adapted to contact a ground surface below the body.

16. A dewatering unit comprising:
a body having a first end, a second end, a first side, a second side, and a bottom that bound and define an interior chamber;
a conveyor assembly provided in the interior chamber and adapted to move articles toward the second end;
wherein the conveyor assembly is generally U-shaped when viewed from the first side;
wherein the generally U-shaped conveyor assembly includes a central portion with a first portion extending at a first angle in a first direction, and a second portion extending at a second angle in a second direction, and wherein the second angle is smaller than the first angle;
at least one first screen positioned below the conveyor assembly; and
at least one second screen provided in one or both of the first side and the second side; wherein the at least one first screen and the at least one second screen are adapted to permit liquid to pass therethrough.

17. The dewatering unit according to claim 16, further comprising a pick breaker provided along the second portion of the conveyor assembly, said pick breaker being rotatable about a transverse axis that extends between the first side and second side of the body.

18. The dewatering unit according to claim 14, further comprising a translation mechanism adapted to move the body across a ground surface, wherein the translation mechanism comprises one or more rail bogies positioned below the bottom of the body, said one or more rail bogies being adapted to move the body along rail tracks.

19. The dewatering unit according to claim 16, further comprising one or more stabilizing assemblies engaged with one or both of the first side and the second side; wherein each stabilizing assembly is movable between a retracted position and an extended position, and when in the extended position, a footing of the stabilizing assembly is adapted to contact a ground surface below the body.

20. The dewatering unit according to claim 16, further comprising a translation mechanism adapted to move the body across a ground surface, wherein the translation mechanism comprises one or more rail bogies positioned below the bottom of the body, said one or more rail bogies being adapted to move the body along rail tracks.

21. A method of dewatering a mixture of a solid material and a liquid; said method comprising:
providing a dewatering unit comprising a body having a first end, a second end, a first side, a second side, and a bottom which bound and define an interior chamber;
providing a conveyor assembly in the interior chamber of the dewatering unit, wherein the conveyor assembly is generally U-shaped when viewed from the first side and comprises a central portion, a first portion extending at a first angle and in a first direction from the central portion, and a second portion extending at a second angle and in a second direction from the central portion, wherein the second angle is smaller than the first angle;
providing one or more first screens below the conveyor assembly;
providing one or more second screens in one or both of the first side and the second side of the dewatering unit;
dropping a mixture of the solid material and the liquid through an opening in a top of the dewatering unit and onto the conveyor assembly;
transporting the solid material on the conveyor assembly towards the second end of the dewatering unit;
allowing some of the liquid in the mixture to drain through the one or more first screens located below the conveyor assembly and out of the dewatering unit;
allowing some of the liquid in the mixture to drain through the one or more second screens located in one or both of the first side and the second side of the dewatering unit and out of the dewatering unit.

22. The method according to claim 21, further comprising:
breaking up some of the solid material in the mixture using a grizzly located between the opening and the conveyor assembly.

23. The method according to claim 21, further comprising:
providing one or more bogies on the dewatering unit;
engaging the one or more bogies on a pair of rail tracks; and
moving the dewatering unit from a first location to a second location along the rail tracks.

24. The method according to claim 23, further comprising:
actuating a plurality of stabilizer assemblies provided on the dewatering unit;
contacting a ground surface with a footing provided on each of the actuator plurality of stabilizer assemblies; and
supporting at least some of the weight of the dewatering unit on the plurality of stabilizing assemblies.

* * * * *